United States Patent
Jeon et al.

(10) Patent No.: US 9,055,257 B2
(45) Date of Patent: *Jun. 9, 2015

(54) METHOD AND SYSTEM FOR REPRODUCING CONTENTS, AND COMPUTER-READABLE RECORDING MEDIUM THEREOF

(71) Applicant: SAMSUNG ELECTRONICS CO., LTD., Gyeonggi-do (KR)

(72) Inventors: Byung-jeong Jeon, Ansan-si (KR); Youn-gun Jung, Yongin-si (KR); Kwan-min Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/168,864

(22) Filed: Jan. 30, 2014

(65) Prior Publication Data

US 2014/0146242 A1 May 29, 2014

Related U.S. Application Data

(63) Continuation of application No. 13/664,928, filed on Oct. 31, 2012, now Pat. No. 8,682,248.

(30) Foreign Application Priority Data

Apr. 7, 2012 (KR) .......................... 10-2012-0036402

(51) Int. Cl.
*H04N 5/44* (2011.01)
*G08C 17/02* (2006.01)
(Continued)

(52) U.S. Cl.
CPC .............. *H04N 5/4403* (2013.01); *G08C 17/02* (2013.01); *H04N 21/42221* (2013.01);
(Continued)

(58) Field of Classification Search
CPC .......... H04N 21/6582; H04N 21/4126; H04N 21/41407; H04N 21/42221; H04N 21/43637; H04N 5/4403; H04B 5/0025; G08C 17/02

USPC ................. 455/3.02, 3.06, 557, 556.1, 556.2, 455/414.1, 414.4, 466; 348/571, 588, 734; 381/300; 709/219; 706/46; 369/59.12, 369/59.25

See application file for complete search history.

(56) References Cited

U.S. PATENT DOCUMENTS 7,155,305 B2 12/2006 Hayes et al.
7,756,467 B2 7/2010 Bent et al.
(Continued)

FOREIGN PATENT DOCUMENTS

WO 2006089555 A1 8/2006

OTHER PUBLICATIONS

International Search Report (PCT/ISA/210) and Written Report (PCT/ISA/237) dated Jul. 15, 2013 from the International Search Authority in counterpart Application No. PCT/KR2013/002897.

(Continued)

*Primary Examiner* — Marceau Milord
(74) *Attorney, Agent, or Firm* — Sughrue Mion, PLLC

(57) ABSTRACT

A content reproducing method and system for performing seamless playback of contents between devices is provided. The contents reproducing system includes a portable device which, when a short distance communication with a remote control which is configured to control an electronic device occurs during reproducing of contents, generates data required by the electronic device for reproducing the contents that are being reproduced, and which transmits the generated data to the remote control; the remote control which receives the data from the portable device and which transmits the received data to the electronic device, in conjunction with the occurrence of the short distance communication with the portable device; and the electronic device for receiving the contents from a contents provider and reproducing the contents.

18 Claims, 18 Drawing Sheets

(51) Int. Cl.
*H04N 21/422* (2011.01)
*H04N 21/4363* (2011.01)
*H04N 21/658* (2011.01)
*H04B 5/00* (2006.01)
*H04N 21/41* (2011.01)
*H04N 21/414* (2011.01)

(52) U.S. Cl.
CPC .... *H04N 21/43637* (2013.01); *H04N 21/6582* (2013.01); *H04B 5/0025* (2013.01); *H04N 21/4126* (2013.01); *H04N 21/41407* (2013.01)

(56) References Cited

U.S. PATENT DOCUMENTS

| | | | |
|---|---|---|---|
| 7,894,854 B2 | 2/2011 | Lee | |
| 8,063,888 B2 | 11/2011 | McFarlane et al. | |
| 8,090,405 B2 | 1/2012 | Lee | |
| 8,107,973 B1 | 1/2012 | Sjothun | |
| 8,159,518 B2 | 4/2012 | Underwood et al. | |
| 8,165,633 B2 | 4/2012 | Chang et al. | |
| 8,195,130 B2 | 6/2012 | Hao et al. | |
| 8,200,868 B1 | 6/2012 | 't Hooft | |
| 8,265,557 B2 | 9/2012 | Chung | |
| 8,682,248 B2* | 3/2014 | Jeon et al. | 455/41.2 |
| 2005/0186988 A1 | 8/2005 | Lim et al. | |
| 2009/0100474 A1 | 4/2009 | Migos | |
| 2009/0163139 A1 | 6/2009 | Wright-Riley | |
| 2009/0276862 A1 | 11/2009 | Komori et al. | |
| 2009/0298535 A1 | 12/2009 | Klein et al. | |
| 2010/0011135 A1 | 1/2010 | Jawa et al. | |
| 2011/0047474 A1 | 2/2011 | Sung et al. | |
| 2012/0175412 A1* | 7/2012 | Grabiner et al. | 235/375 |
| 2012/0208592 A1 | 8/2012 | Davis et al. | |
| 2012/0220224 A1* | 8/2012 | Walker | 455/41.1 |
| 2012/0265696 A1* | 10/2012 | Tuchman et al. | 705/304 |
| 2012/0311723 A1* | 12/2012 | Britt et al. | 726/28 |
| 2012/0315848 A1* | 12/2012 | Smith et al. | 455/41.1 |
| 2013/0024197 A1* | 1/2013 | Jang et al. | 704/246 |
| 2013/0028132 A1* | 1/2013 | Choi | 370/254 |
| 2013/0035086 A1 | 2/2013 | Chardon et al. | |

OTHER PUBLICATIONS

Communication dated Jul. 15, 2013 issued by the International Searching Authority in International Application No. PCT/KR2013/002897 (PCT/ISA/220, 210, 237).

Communication dated Nov. 5, 2013 issued by the European Patent Office in counterpart European Patent Application No. 13162737.4.

Joao Pedro Sousa, et al; "Aura: An Architectural Framework for User Mobility in Ubiquitous Computing Environments"; Proceedings of the 3rd Working IEEE/IFIP Conference on Software Architecture; XP007917022; Aug. 1, 2002; pp. 1-14.

Jun Rekimoto; "Pick-and-Drop: A Direct Manipulation Technique for Multiple Computer Environments"; Proceedings of the ACM Symposium on User Interface Software and Technology; XP002304175; Jan. 1, 1997; pp. 31-39.

Naohiko Kohtake, et al; "InfoStick: an interaction device for inter-Appliance Computing"; Proceedings of HUC: International Symposium Onhandheld and Ubiquitous Computing; vol. 1707; XP002378028; Jan. 1, 1999; 13 pgs.

* cited by examiner

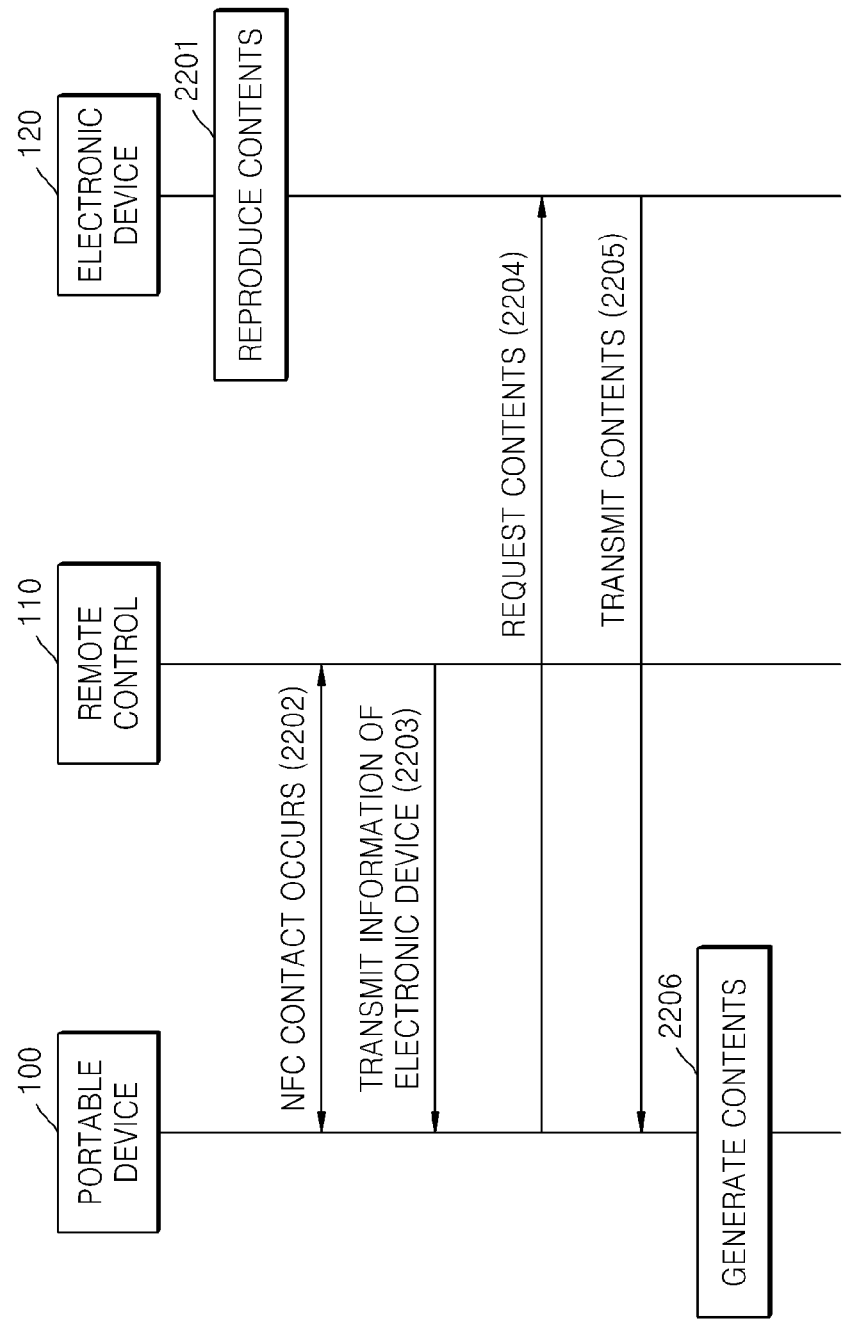

METHOD AND SYSTEM FOR REPRODUCING CONTENTS, AND COMPUTER-READABLE RECORDING MEDIUM THEREOF

CROSS-REFERENCE TO RELATED PATENT APPLICATION

This is a Continuation of application Ser. No. 13/664,928 filed Oct. 31, 2012, which claims priority from Korean Patent Application No. 10-2012-0036402, filed on Apr. 7, 2012, in the Korean Intellectual Property Office, the disclosure of which is incorporated herein by reference in its entirety.

BACKGROUND

1. Field

Exemplary embodiments relate to reproduction of contents, and more particularly, to a method and system for reproducing contents, by which seamless playback of contents is performed between devices.

2. Description of the Related Art

Functions of devices such as smart phones, hand-held personal computers (PCs), tablet PCs, and smart televisions (TVs) have gradually diversified. Accordingly, it has become possible to reproduce the same contents by using different devices.

For example, a user can watch and listen to broadcasting contents, which contents the user is watching and listening to on a smart TV, on a smart phone. A game application which is executed on a smart phone can also be executed on a smart TV. A sound source which is executed on a smart phone can also be executed on a smart TV. Accordingly, there is a need to facilitate a performance of a seamless playback of contents between devices.

SUMMARY

Exemplary embodiments provide a method and a system for performing a seamless playback of contents between devices based on short distance communication and a computer-readable recording medium thereof.

Exemplary embodiments also provide a method and a system for performing a seamless playback of contents between devices based on short distance communication by sharing information required for reproducing contents between the devices, and a computer-readable recording medium thereof.

Exemplary embodiments also provide a method and a system for performing a seamless playback of contents between devices based on a near field communication (NFC) contact, and a computer-readable recording medium thereof.

According to an aspect of an exemplary embodiment, there is provided a contents reproducing method which is executable by using a portable device, the contents reproducing method including reproducing contents; detecting an occurrence of a short distance communication with a remote control which is configured to control an electronic device; generating data required by the electronic device for reproducing the contents; and transmitting the generated data to the remote control.

The short distance communication may be based on at least one near field communication (NFC) standard.

According to an aspect of another exemplary embodiment, there is provided a contents reproducing method which is executable by using a remote control which is configured to control an electronic device, the contents reproducing method including detecting an occurrence of a short distance communication with a portable device; receiving, from the portable device, data required by the electronic device for reproducing contents that are being reproduced by the portable device; and transmitting the received data to the electronic device.

According to an aspect of another exemplary embodiment, there is provided a portable device which includes a short distance communication unit which performs short distance communication; a touch screen which displays an image which includes contents that are being reproduced, and which receives user input information; and a processor which provides a user interface based on the touch screen, controls a reproduction of the contents, detects an occurrence of a short distance communication with a remote control which is configured to control an electronic device via the short distance communication unit, generates data required by the electronic device for reproducing the contents, and transmits the generated data to the remote control via the short distance communication unit.

According to an aspect of another exemplary embodiment, there is provided a portable device which includes a short distance communication unit which performs short distance communication; a touch screen which displays an image which includes contents that are being reproduced, and which receives user input information; at least one processor which provides a user interface based on the touch screen; and a storage which stores at least one program that is executable by the at least one processor, wherein the at least one program includes commands for reproducing the contents, detecting an occurrence of the short distance communication with a remote controller which is configured to control an electronic device via the short distance communication unit, generating data required by the electronic device for reproducing the contents, and transmitting the generated data to the remote controller.

According to an aspect of another exemplary embodiment, there is provided a remote control which is configured to control an electronic device, the remote control including a short distance communication unit which performs short distance communication with a portable device; a user input unit which receives user information; and a processor which detects an occurrence of a short distance communication with the portable device via the short distance communication unit, receives data from the portable device via the short distance communication unit, and transmits the received data to the electronic device via a wireless communication unit, wherein the received data includes data required by the electronic device for reproducing contents that are being reproduced by the portable device.

According to an aspect of another exemplary embodiment, there is provided a contents reproducing system which includes a portable device which, when a short distance communication with a remote control which is configured to control an electronic device occurs during a reproducing of contents, generates data required by the electronic device for reproducing the contents, and which transmits the generated data to the remote control; the remote control which receives the transmitted data from the portable device and which transmits the received data to the electronic device based on an occurrence of the short distance communication with the portable device; and the electronic device which receives the contents from a contents provider based on the data received from the remote control and which reproduces the received contents.

According to an aspect of another exemplary embodiment, there is provided a contents reproducing method which is executable by using a portable device, the method including detecting an occurrence of a short distance communication with a remote control which is configured to control an electronic device; receiving, from at least one of the remote control and the electronic device, data required by the portable device for reproducing contents that are being reproduced by the electronic device; receiving the contents from a contents provider, based on the received data; and reproducing the received contents.

According to an aspect of another exemplary embodiment, there is provided a contents reproducing method which is executable by using a remote control which is configured to control an electronic device, the contents reproducing method including detecting an occurrence of a short distance communication with a portable device; receiving, from the electronic device, data required by the portable device for reproducing contents that are being reproduced by the electronic device; and transmitting the received data to the portable device.

According to an aspect of another exemplary embodiment, there is provided a contents reproducing method which is executable by using an electronic device, the contents reproducing method including reproducing contents; receiving, from at least one of a remote control which is configured to control the electronic device and a portable device, a data transmitting request signal relating to data required by the portable device for reproducing the contents; generating the data required by the portable device for reproducing the contents; and transmitting the generated data to at least one of the remote control and the portable device, wherein the data transmitting request signal is received based on an occurrence of a short distance communication between the remote control and the portable device.

According to an aspect of another exemplary embodiment, there is provided a non-transitory computer-readable recording medium having recorded thereon at least one program including commands for executing the above-described contents reproducing method which is executable by using a portable device.

According to an aspect of another exemplary embodiment, there is provided a non-transitory computer-readable recording medium having recorded thereon at least one program including commands for executing the above-described contents reproducing method which is executable by using a remote control which is configured to control an electronic device.

According to an aspect of another exemplary embodiment, there is provided a non-transitory computer-readable recording medium having recorded thereon at least one program including commands for executing the above-described contents reproducing method which is executable by using an electronic device.

BRIEF DESCRIPTION OF THE DRAWINGS

The above and/or other aspects will become more apparent by describing in detail exemplary embodiments with reference to the attached drawings in which:

FIG. 22 is a flowchart which illustrates operations between the portable device, the remote control, and the electronic device in a contents reproducing method, according to another exemplary embodiment.

DETAILED DESCRIPTION

Figure 1A:
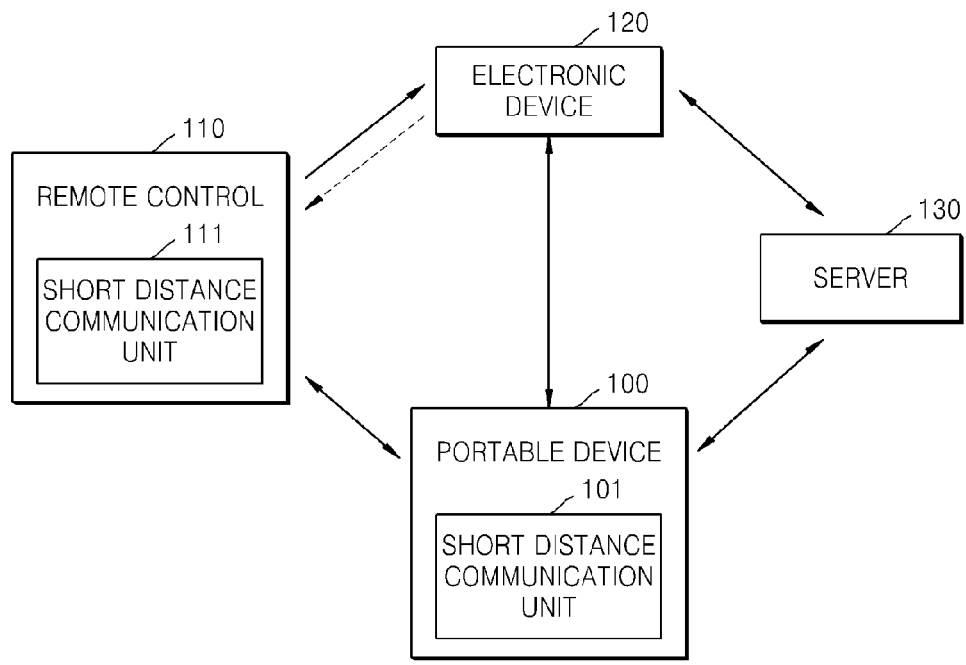
FIG. 1A is a structural diagram of a contents reproducing system according to an exemplary embodiment.

As the detailed description provided herein allows for various changes and numerous embodiments, particular exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description provided herein, certain detailed explanations of related art are omitted when it is deemed that they may unnecessarily obscure the essence of the present disclosure.

The terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that have been widely used in the technical art to which the exemplary embodiments pertain. However, some of the terms used herein may be created reflecting intentions of technicians in this art, precedents, or new technologies. Further, some of the terms used herein may be arbitrarily chosen by the present applicant. In this case, these terms are defined in detail below. Accordingly, the specific terms used herein should be understood based on the unique meanings thereof and the whole context of the present disclosure.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list.

Throughout this specification, the term "contents" may include a video image, a still image, a sound source, a file, broadcast contents, a text, and/or any other suitable form of contents. In addition, the contents may include social network service-based contents, such as, for example, a mobile messenger, an internet telephone, twitter, and a blog, and application-based contents. The application-based contents may include game application-based contents. The contents are not limited thereto.

Throughout this specification, the term "seamless playback of contents," in the reproduction of the contents, refers to a process for continuously reproducing contents in different devices as if the contents are reproduced by a single device based on an occurrence of a short distance communication, such as, for example, near field communication (NFC) contact. The seamless playback of contents may also refer to a process for reproducing contents in a same environment or a similar reproducing environment between devices. During the seamless playback, parameters relating to a reproducing environment may include, for example, caption settings, equalizer settings, sound settings, resolution, and/or any other suitable parameters relating to a reproducing environment.

For example, when contents that are being reproduced by a first device include movie contents having a 16:9 aspect ratio and a three-dimensional (3D) stereophonic effect, seamless playback of contents in a second device, based on an occurrence of a short distance communication, such as, for example, a NFC contact between a remote control which is configured to control the second device and the first device, may refer to a process for reproducing contents from a time when a reproduction of the contents is stopped in the first device.

The time when reproduction of the contents is stopped in the first device is used for understanding a connection relationship between contents that are being reproduced by the first device and contents to be reproduced by the second device with respect to the seamless playback of contents. Thus, the exemplary embodiments are not limited to the case in which a reproduction of contents that are being reproduced by the first device is stopped during the seamless playback of contents.

When contents that are being reproduced by the first device include movie contents having a 16:9 aspect ratio and a 3D stereophonic effect, the seamless playback of contents in the second device, based on an occurrence of a short distance communication, such as, for example, a NFC contact between a remote control which is configured to control the second device and the first device, may refer to a process for reproducing contents from a time when a reproduction of the movie contents having a 16:9 aspect ratio and a 3D stereophonic effect is stopped in the first device. Thus, a user may continually watch and listen to the movie contents on the second device.

Reproduction of contents according to a 16:9 aspect ratio and a 3D stereophonic effect may refer to a process for reproduction of contents in the same or similar reproducing environments due to the 16:9 aspect ratio and the 3D stereophonic effect. Information relating to the 16:9 aspect ratio and the 3D stereophonic effect may be contained in meta data relating to respective contents used throughout this specification.

As another example, when contents that are being reproduced by the first device include a mobile messenger by which a user chats with "A," the seamless playback of contents in the second device, based on an occurrence of a short distance communication, such as, for example, a NFC contact between a remote control which is configured to control the second device and the first device, may refer to a process for opening a chatting window with "A" based on the mobile messenger and transmitting and receiving messages. Thus, a user may continually transmit and receive messages with "A" via a chatting window which is opened by using the second device.

As another example, when contents that are being reproduced by the first device include a game application, the seamless playback of contents in the second device, based on an occurrence of a short distance communication, such as, for example, a NFC contact between a remote control which is configured to control the second device and the first device, may refer to a process for starting the game application from a game level of the game application, which is executed by using the first device, or reproducing the same game contents as the executed game contents. Thus, the user may continually play the game by using the second device.

Throughout this specification, user input information may be dependent upon a user gesture. The user gesture may be defined based on an input device. In particular, when the input device is a touch screen-based device, the user gesture may include, for example, but is not limited to, a tap (or a touch), a touch and hold, a touch and drag, a double tap, a drag, a panning, a flick, a drag and drop, a sweep, and/or any other suitable user gesture.

A user gesture which is performed by using the touch screen-based device may be performed by using a user finger or a touch tool (for example, a stylus pen). When the input device is a camera-based device, a user gesture may include a spatial gesture based on an image captured by a camera. When the input device includes physical buttons, a dial, a slider switch, a joystick, a click wheel, and/or any other suitable means for receiving user input, user input information may be dependent upon a physical control of the user with respect to the input device.

Throughout the specification, NFC contact may refer to NFC tagging.

Hereinafter, the present inventive concept will be described in detail by explaining exemplary embodiments with reference to the attached drawings. The same reference numerals in the drawings denote like elements, and a repeated description thereof will not be provided.

FIG. 1A is a structural diagram of a contents reproducing system according to an exemplary embodiment. FIG. 1A may refer to a structural diagram of a network for performing a contents reproducing method according to an exemplary embodiment. The contents reproducing system shown in FIG. 1 includes a portable device 100, a remote control device 110 which is usable for controlling an electronic device 120, the electronic device 120, and a server 130.

However, the contents reproducing system according to the present exemplary embodiment is not limited to the case shown in FIG. 1A. For example, the contents reproducing system according to the present exemplary embodiment may include a plurality of servers which provide respective contents. In addition, the contents reproducing system according to the present exemplary embodiment may include the portable device 100, the remote control 110, and the electronic device 120. In the aforementioned example relating to the seamless playback of contents, the portable device 100 and the electronic device 120 may be exemplified as a first device and a second device, respectively. Thus, hereinafter, the portable device 100 may also refer to a first device and the electronic device 120 may also refer to a second device.

In the contents reproducing system shown in FIG. 1A, when short distance communication units 101 and 111 are configured based on an NFC communication module, a seamless playback of contents may be performed according to a user's intention by NFC contact, a small amount of data may be transmitted between the portable device 100 and the remote control 110, and information may be transmitted for user authentication between the portable device 100 and the electronic device 120 or between the portable device 100 and the remote control 110.

An example of the portable device 100 shown in FIG. 1A may include a smart phone, a notebook, a tablet PC, a mobile device, a handheld device or a handheld computer, a media player, a personal digital assistant (PDA), and/or any other suitable type of portable device.

The portable device 100 includes the short distance communication unit 101 which is usable for performing short distance communication. The short distance communication unit 101 may include, for example, at least one of an NFC-based communication chip, a radio frequency identification (RFID)-based communication chip, and other short distance communication chips.

When the short distance communication unit 101 is configured based on NFC standards, the short distance communication unit 101 may include an active circuit for transmitting and receiving data and information to and from the short distance communication unit 111 when the short distance communication unit 101 contacts the short distance communication unit 111 or is brought into relatively close physical proximity with respect to the short distance communication unit 111 at a predetermined distance. In this case, the short distance communication unit 111 may include a passive NFC tag, but may also include an active circuit which is similar to the active circuit described above with respect to the short distance communication unit 101. The predetermined distance may be set to approximately within a range of between zero and 20 centimeters.

When the short distance communication unit 101 is configured based on RFID, the short distance communication unit 101 may include an active circuit for transmitting and receiving data and information to and from the short distance communication unit 111 at a relatively far distance, as compared with a case in which the short distance communication unit 101 is configured based on NFC. In this case, the short distance communication unit 111 may include a passive RFID tag, but may also include an active circuit which is similar to the active circuit described above with respect to the short distance communication unit 101.

In addition, a button (not shown) for transmitting a user intention relating to whether the contact between the short distance communication units 101 and 111 or the physical approach is valid with respect to the portable device 100 may be installed on the portable device 100, thereby preventing the short distance communication unit 101 from operating when an unnecessary contact or unnecessary physical approach occurs between the short distance communication units 101 and 111.

The short distance communication unit 101 may convert data for transmission to the short distance communication unit 111 into a message which has a short distance communication data exchange format, and may transmit the short distance communication data exchange format message to the short distance communication unit 111. Accordingly, when data is transmitted to the short distance communication unit 111, the short distance communication unit 101 may perform a data write function.

In addition, the short distance communication unit 101 may convert a short distance communication data exchange format message which is received from the short distance communication unit 111 into data that is processable by the portable device 100. Accordingly, when the short distance communication unit 101 receives a message from the short distance communication unit 111, the short distance communication unit 101 may perform a read function.

The short distance communication unit 111 may include at least one of a passive NFC tag and a passive RFID tag, when the remote control 110 is capable of one-way communication with the electronic device 120. However, when the remote control 110 and the electronic device 120 are capable of two-way communication, the short distance communication unit 111 may include an active circuit for performing a read function or a write function, similarly as the short distance communication unit 101.

In particular, when the short distance communication unit 111 includes an active circuit and transmits a message to the short distance communication unit 101, the short distance communication unit 111 performs the write function. In addition, when the short distance communication unit 111 includes an active circuit and receives a message from the short distance communication unit 101, the short distance communication unit 111 performs the read function.

When the short distance communication units 101 and 111 are configured based on NFC, each of the short distance communication units 101 and 111 may be used as an NFC interface. When the short distance communication units 101 and 111 are configured based on RFID, each of the short distance communication units 101 and 111 may be used as an RFID interface.

The remote control 110 controls the electronic device 120. As described above, the remote control 110 may be configured to control the electronic device 120 in order to perform one-way communication or two-way communication with the electronic device 120.

The electronic device 120 is a media reproducing device that is controllable by using the remote control 110. The electronic device 120 may include, for example, a TV having a communication function or a digital consumer electronics (CE) device having a communication function. The digital CE device may include, for example, a refrigerator, an audio system, and/or any other suitable type of digital CE device, and may also include a digital television (DTV) or an Internet protocol television (IPTV).

The server 130 provides contents that are requested by at least one of the electronic device 120 and the portable device 100. The server 130 may include a contents providing server which is connected via a web page, a broadcasting contents providing server, a cloud server, a home gateway, and/or any other suitable type of server device.

The server 130 may store contents and data required for reproducing the contents based on a request of either of both of the electronic device 120 and the portable device 100. The contents and the data required for reproducing the contents, which are stored in the server 130, may be provided from either or both of the electronic device 120 and the portable device 100. However, the server 130 may collect the contents and the data required for reproducing the contents from another database server (not shown).

In the contents reproducing system shown in FIG. 1A, when the portable device 100 reproduces contents, based on an occurrence of a short distance communication between the short distance communication units 101 and 111, data to be shared between the portable device 100 and the electronic device 120 may be transmitted via the remote control 110 in order to perform the seamless playback of contents by using the electronic device 120.

In the contents reproducing system shown in FIG. 1A, when the electronic device 120 reproduces contents, based on an occurrence of a short distance communication between the short distance communication units 101 and 111, data to be shared between the electronic device 120 and the portable device 100 may be transmitted via the remote control 110 or by direct communication between the electronic device 120 and the portable device 100 in order to perform the seamless playback of contents by using the portable device 100. However, transmission of the shared data in the contents reproducing system shown in FIG. 1A is not limited to the above-described example.

Although not illustrated in FIG. 1A, in order for the portable device 100 or the electronic device 120 to perform the seamless playback of contents reproduced by the portable device 100 at a later time, information which is required for reproducing the contents may be transmitted to and stored in the server 130, and this information may subsequently be downloaded and used by the portable device 100 or the electronic device 120, if necessary.

In addition, in order for the portable device 100 or the electronic device 120 to perform the seamless playback of contents reproduced by the electronic device 120 at a later time, information which is required for reproducing the contents may be transmitted to and stored in the server 130, and this information may subsequently be downloaded and used by the portable device 100 or the electronic device 120, if necessary. In this case, the contents that are being reproduced may be transmitted to and stored in the server 130.

Figure 1B:
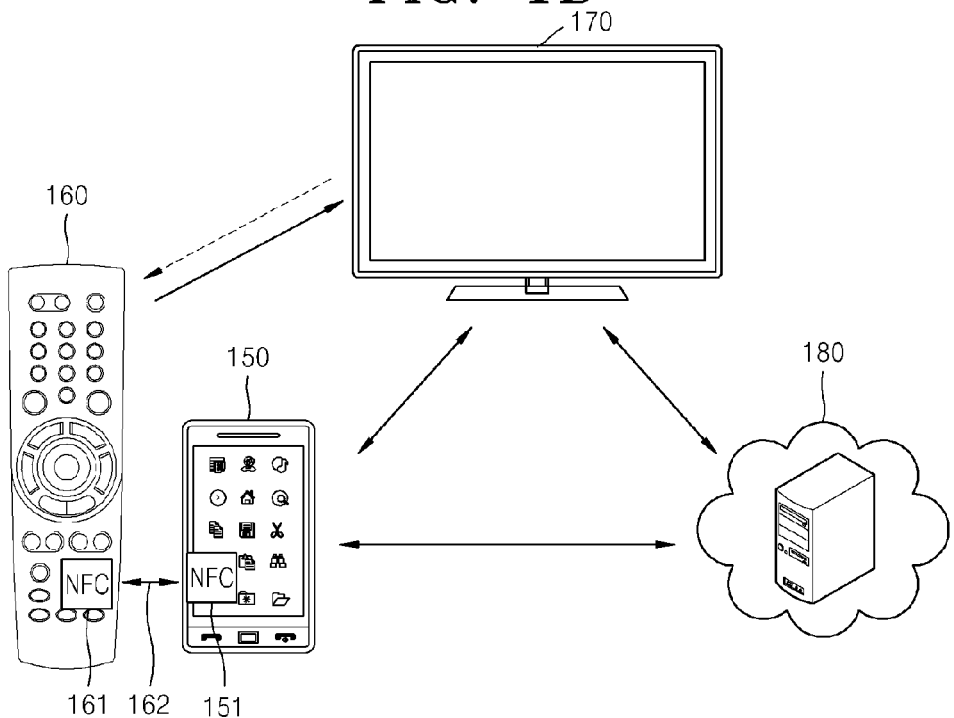
FIG. 1B is an example of the contents reproducing system of FIG. 1A.

In the contents reproducing system shown in FIG. 1A, in a case in which the portable device 100 is a smart phone, the electronic device 120 is a TV, and each of the short distance communication units 101 and 111 is an NFC-based communication module, the content reproducing system shown in FIG. 1A functions as a content reproducing system which is shown in FIG. 1B.

The contents reproducing system shown in FIG. 1B includes a smart phone 150 which includes an NFC-based communication module 151, a remote control 160 which includes an NFC-based communication module 161, a TV 170 that is controllable by using the remote control 160, and a server 180 that is connected to the TV 170 and the smart phone 150 and that provides information to each of the TV 170 and the smart phone 150.

Thus, in the contents reproducing system shown in FIG. 1B, when the smart phone 150 reproduces contents, based on an occurrence of a short distance communication (or contact) between the NFC-based communication module 151 of the smart phone 150 and the NFC-based communication module 161 of the remote control 160, data to be shared between the TV 170 and the smart phone 150 may be transmitted via the remote control 110 in order to perform the seamless playback of contents by using the TV 170.

In the contents reproducing system shown in FIG. 1B, when the TV 170 reproduces contents, based on an occurrence of a short distance communication (or contact) between the NFC-based communication module 151 of the smart phone 150 and the NFC-based communication module 161 of the remote control 160, data to be shared between the TV 170 and the smart phone 150 may be transmitted via the remote control 160 or by direct communication between the TV 170 and the smart phone 150 in order to perform the seamless playback of content by using the smart phone 150. However, transmission of the shared data in the contents reproducing system shown in FIG. 1B is not limited to the above-described example, similarly as described above with respect to FIG. 1A.

Figure 2:
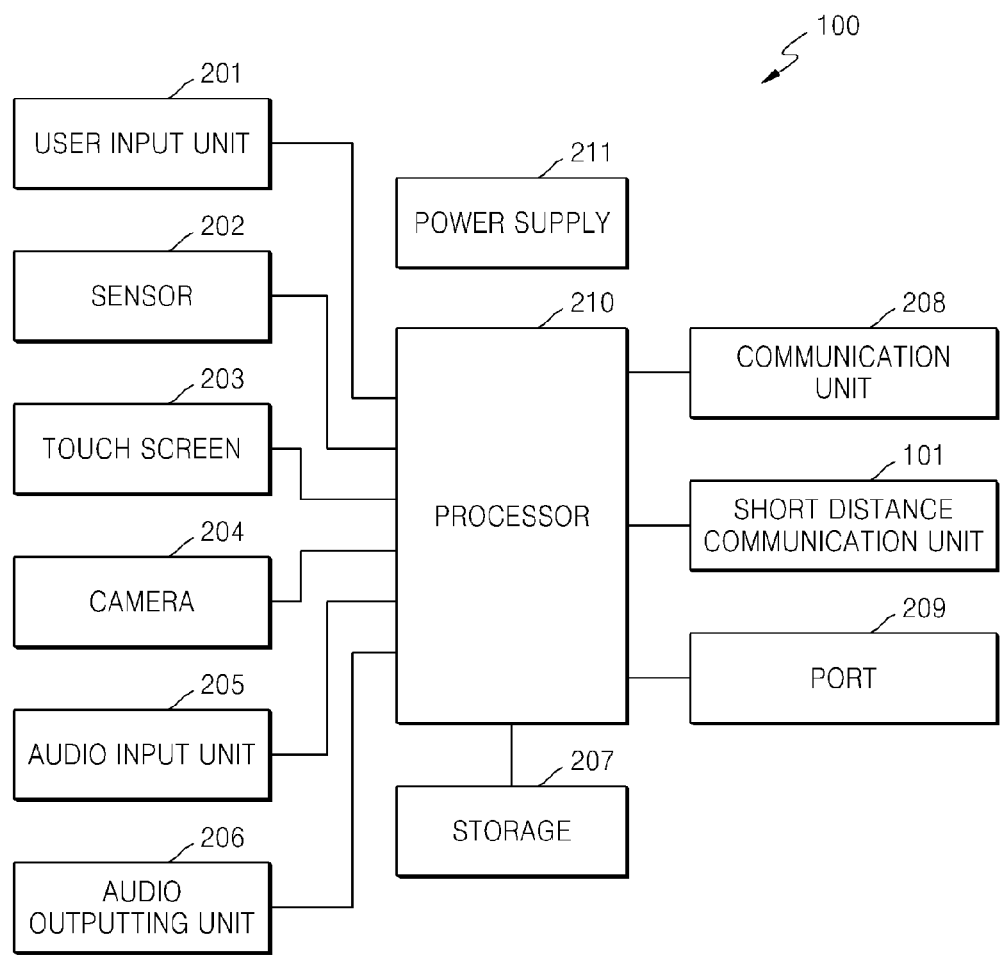
FIG. 2 is a functional block diagram which illustrates a portable device as shown in FIG. 1A, according to an exemplary embodiment.

FIG. 2 is a functional block diagram of the portable device 100 shown in FIG. 1A, according to an exemplary embodiment.

Referring to FIG. 2, the portable device 100 includes a user input unit 201, a sensor 202, a touch screen 203, a camera 204, an audio input unit 205, an audio output unit 206, a storage 207, a communication unit 208, a port 209, a processor 210, a power supply 211, and a short distance communication unit 101. The configuration of the portable device 100 is not limited to the case illustrated in FIG. 2.

The user input unit 201 generates input data (or output data) for controlling an operation of the portable device 100 or the above-described user input information. The user input unit 201 may include, for example, at least one of a key pad, a dome switch, a touch pad that replaces a mouse, a jog wheel, a jog switch, hardware (H/W) buttons, and/or any other suitable means for receiving user input.

The sensor 202 detects a current state of the portable device 100, such as, for example, a position of the portable device 100, user contact, a bearing of the portable device 100, acceleration or deceleration of the portable device 100, and/or any other suitable parameter relating to the current state of the portable device 100, and generates a sensing signal for controlling an operation of the portable device 100. The sensor 202 may include a proximity sensor.

The proximity sensor refers to a sensor for detecting the presence of an object that approaches at least one of a predetermined detection surface and an object located in the vicinity of the sensor by using an electromagnetic field force or infrared rays in an absence of physical contact. Examples of the proximity sensor may include any one or more of a transmissive photoelectric sensor, a direct reflection-type photoelectric sensor, a mirror reflective-type photoelectric sensor, a high-frequency oscillation-type proximity sensor, a capacitive proximity sensor, a magnetic type proximity sensor, an infrared ray proximity sensor, and/or any other suitable type of proximity sensor.

User input data which is obtained by using the touch screen 203 may be generated based on a user selection or a user request, which may be manifested as a user gesture. Similarly as the above-described example of the user gesture, the user gesture may be variously defined according to various combinations of the number of touches, a touch pattern, and a touch intensity. It will be understood that a touch on the touch screen 203 by a user's finger is based on body parts that are capable of touching a touch area of the touch screen 203.

In addition, the touch screen 203 may include various sensors for detecting a touch or a proximity touch of the touch screen 203. The sensor included in the touch screen 203 includes a sensor which detects a user gesture or pattern on the touch screen 203 and which generates a signal obtained by sensing at least one of a drag, a flick, a tap, a touch and hold, a touch and drag, a double tap, a panning, a sweep, and/or any other suitable form of user touch input, which are recognized as a user gesture on the touch screen 203.

An example of the sensor for detecting a touch of the touch screen 203 may include a tactile sensor. The tactile sensor may detect various pieces of information, such as, for example, the roughness of a contact surface, the hardness of a contacted object, a temperature of a contacted point, and the like. A touch of the touch screen 203 may be generated by touching a panel with a pointer. The touch may include a multi-touch. A proximity touch of the touch screen 203 corresponds to a case in which a pointer does not actually touch the touch screen 203, but instead approaches the touch screen 203 at a predetermined adjacent distance. The pointer is a tool for touching or proximity-touching a predetermined portion of the touch screen 203. Examples of the pointer may include a stylus pen, a finger, or a body part functioning as a finger, a tool corresponding to a finger, and/or any other suitable type of pointer. Thus, the pointer will also be referred to as an external input device.

The touch screen 203 outputs information that is processed by the portable device 100. For example, the touch screen 203 displays an image in response to a user gesture or a touch pattern which is detected by the sensor 202 included in the touch screen 203, control data or user input information which is received via the user input unit 201, or a signal that is detected via the sensor 202.

The touch screen 203 will also be referred to as an input and output device. When the touch screen 203 is an input and output device, an image displayed on the touch screen 203 includes a user interface (UI) image or a graphic user interface (GUI) image. The touch screen 203 may display an image which includes information relating to contents that are being reproduced and may receive the user input information.

The touch screen 203 may include, but is not limited to, a liquid crystal display, a thin film transistor-liquid crystal display, an organic light-emitting diode display, a flexible display, a three-dimensional (3D) display, an active-matrix organic light-emitting diode (AMOLED) display, and/or any other suitable type of display. The touch screen 203 will also be referred to as a display. Two or more touch screens 203 may be included according to a configured type of the portable device 100.

The camera 204 processes an image frame of a still image or a video image which is obtained by an image sensor in a video call mode or a photograph mode. In addition, the processed image frame may be displayed on the touch screen 203. The image frame processed by the camera 204 may be stored in the storage 207 or may be transmitted outside the portable device 100 via the communication unit 208 or the port 209. Two or more cameras 204 may be included according to a configured type of the portable device 100. In addition, the camera 204 may be used as an input device for recognizing a user's spatial gesture.

The audio input unit 205 receives an external sound signal, converts the external sound signal into electrical sound data, and transmits the electrical sound data to the processor 210 in at least one of a call mode, a record mode, a voice recognition mode, and/or any other suitable mode for transmitting sound data. The audio input unit 205 may include, for example, a microphone. The audio input unit 205 may be configured to implement various noise removing algorithms for removing noise generated during a process for receiving the external sound signal. The sound signal that is received by using the audio input unit 205 may contain user input information based on a natural language for performing a method of reproducing contents according to an exemplary embodiment. The user input information based on a natural language may refer to voice-recognition based user input information. The external sound signal that is received via the audio input unit 205 may be stored in the storage 207 or may be transmitted by the portable device 100 via at least one of the communication unit 208 and the port 209.

The user input unit 201, the sensor 202, the touch screen 203, the camera 204, and the audio input unit 205 may each also be referred to as an input device or an input/output device according to a user interface function between the portable device 100 and a user. For example, when the user interface function between the portable device 100 and the user has a touch recognition function, a voice recognition function, and a spatial gesture recognition function, each of the user input unit 201, the sensor 202, the camera 204, and the audio input unit 205 may also be referred to as an input device, and the touch screen 203 may be referred to as an input/output device.

The audio output unit 206 outputs at least one of a sound signal and an audio signal which is received from an external source in a call mode, an audio reproducing mode, and/or any other mode which is suitable for receiving an audio signal. The audio output unit 206 may include a speaker. According to the present exemplary embodiment, when the portable device 100 reproduces contents, if the reproduced contents include an audio signal, the audio output unit 206 outputs the audio signal included in the reproduced contents. The audio input unit 205 and the audio output unit 206 may be integrated with each other, such as, for example, a headset.

The storage 207 stores a resource and at least one program that is executable by the processor 210 that will be described below. The at least one program may include a program for performing a contents reproducing method according to an exemplary embodiment, an operating system (OS) program of the portable device 100, an application that is set in the portable device 100, and one or more programs which are respectively required for performing various functions (for example, a communication function and a display function) of the portable device 100. The resource may include at least one of meta data relating to the contents according to the aforementioned exemplary embodiments, device information relating to the portable device 100, user information relating to the portable device 100, information required for executing an application that resides in the portable device 100, and programs required for performing the above-described functions.

In addition, the storage 207 includes information required for generating data required for reproducing contents that are being reproduced. The data required for reproducing contents that are being reproduced may include data required by the electronic device 120 for performing a seamless playback of the contents that are being reproduced by the portable device 100.

The required contents may include at least one of information relating to a contents provider, device-specific information relating to the portable device 100, user information relating to the portable device 100, meta data relating to contents that are reproduced, and information relating to a time when contents are reproduced, which corresponds to a time when an occurrence of a short distance communication is detected. The meta data relating to the contents may include title information relating to the contents and the above-described reproducing environment information. The information relating to the contents provider may refer to information relating to a contents reproducing path (for example, channel information and information relating to a contents providing server).

The storage 207 may independently include a storage which stores at least one program which is required for performing various functions of the portable device 100, and a storage which stores at least one program for performing the contents reproducing method according to an exemplary embodiment, resources, and applications, in addition to the above-described OS system.

The storage 207 may include at least one of a high-speed random access memory, a magnetic disc storing device, a non-volatile memory such as a flash memory, and/or other non-volatile memories. Thus, the storage 207 may be referred to as a memory.

Programs stored in the storage 207 may be divided into a plurality of modules according to their functions. In particular, programs stored in the storage 207 may be divided into an operating module, a communication module, a graphic module, an input module, and/or any other suitable type of program module, but the exemplary embodiments are not limited thereto.

The communication module may include, but is not limited to, at least one of a broadcast receiving module, a mobile communication module, a wireless Internet module, a wired Internet module, a short distance communication module, and a position information module, as described below with respect to the communication unit 208. The short distance communication module may include at least one of an NFC module, a Bluetooth module, a WiFi direct module, an RFID module, and/or any other suitable type of module.

The input module may include, but is not limited to, at least one of a touch module based on the touch screen 203, a hardware key input module based on the user input unit 201, a position recognition module of the portable device 100 and a motion recognition module, based on the sensor 202, a module for recognizing user contact, a module for recognizing acceleration or deceleration of the portable device 100, a motion recognition module based on the camera 204, and/or any other suitable type of module.

The position information module may include, but is not limited to, a position tracing module of the portable device 100, which is based on a global positioning system (GPS).

The graphic module may adjust the image quality on the touch screen 203 with respect to the seamless playback of contents between devices, but is not limited thereto.

According to the present exemplary embodiment, the application module stored in the storage 207 may include a module for seamless playback of contents between devices. The module may be configured as a module for seamless playback of contents between devices in conjunction with NFC contact between the NFC-based communication module 161 of the remote control 160 of FIG. 1B and the NFC-based communication module 151 of the smart phone 150, or alternatively, may include at least one of various modules based on short distance communication other than the NFC contact between devices.

The module for seamless playback of contents between devices may be classified into various modules such as a module for seamless playback of contents from the portable device 100 only to a device controlled by a remote control, a module for seamless playback of contents from an external device only to the portable device 100, and a module obtained by combining these two modules, but is not limited thereto.

The communication unit 208 may be configured to transmit and receive data to and from the electronic device 120 and the server 130 via a wireless network such as wireless Internet, wireless intranet, a wireless telephone network, a wireless LAN, Wi-Fi, Wi-Fi direct (WFD), 3 generation (3G), 4G, Bluetooth, infrared data association (IrDA), RFID, ultra wideband (UWB), ZigBee, and NFC or a wired network such as wired Internet.

When both of the short distance communication unit 101 and the communication unit 208 are based on RFID, the communication unit 208 may include an RFID-based communication unit having a further maximum communication distance than an RFID-based communication unit included in the short distance communication unit 101.

The communication unit 208 may include, but is not limited to, at least one of a broadcast receiving module, a mobile communication module, a wireless Internet module, a wired Internet module, a short distance communication module, and a position information module.

The broadcast receiving module receives a broadcast signal and/or broadcast-related information from an external broadcast management server via a broadcast channel. The broadcast channel may include a satellite channel or a terrestrial channel. The mobile communication module transmits and receives a wireless signal with at least one of a base station, an external device (for example, the electronic device 120), and the server 130 on a mobile communication network. The wireless signal may include at least one of a sound call signal, a video call signal, and/or various types of data according to transmission of a text/multimedia message. The wireless Internet module may refer to a module for wireless Internet access. The wired Internet module may refer to a module for wired Internet access.

The short distance communication module may refer to a module for short distance communication. In addition, the short distance communication module may use a short distance communication technology such as at least one of Bluetooth, RFID, IrDA, UWB, ZigBee, WFD, NFC, and/or any other suitable communication technology. The position information module may include a module for checking or obtaining a position of the portable device 100. An example of the position information module may be a GPS module. The GPS module receives position information from a plurality of artificial satellites. The position information may include coordinate information which is indicated by latitude and longitude.

The port 209 may transmit and receive data to and from an external device (not shown) by using a plug-and-play interface such as a universal serial bus (USB) port (not shown).

The plug-and-play interface may refer to a module that automatically recognizes the external device when the external device is inserted into a plug of the portable device 100.

The power supply 211 supplies power to various components of the portable device 100. The power supply 211 includes one or more power supplies, such as for example, a battery or an alternating current (AC) power supply. The portable device 100 may not include the power supply 211 and may include a connection unit (not shown) that is capable of being connected to an external power supply (not shown).

The processor 210 may control an overall operation of the portable device 100 and may also be referred to as one or more processors. Although FIG. 2 shows a case in which the processor 210 is configured as a single chip, the processor 210 may also be referred to as one or more processors because the processor 210 may be classified into a plurality of processors and may operate according to functions of the portable device 100.

The processor 210 may control overall operations of the user input unit 201, the sensor 202, the touch screen 203, the camera 204, the audio input unit 205, the audio output unit 206, the storage 207, the communication unit 208, the port 209, and the short distance communication unit 101. Thus, the processor 210 may also be referred to as a controller, a microprocessor, a digital signal processor, or the like. In addition, the processor 210 may provide a user interface by using at least one of the user input unit 201, the sensor 202, the touch screen 203, the camera 204, and the audio input unit 205.

The processor 210 may execute at least one program that is related to a contents reproducing method according to an exemplary embodiment. The processor 210 may read the program from the storage 207 and may execute the program, or alternatively, may download the program from an external device such as an application providing server (not shown) or a market sever (not shown) which is connected to the processor 210 via the communication unit 208 and may execute the program. It would be understood that the processor 210 may include an interface function unit between various functional modules inside the portable device 100 and the processor 210. An operation of the processor 210, which is related to a contents reproducing method according to an exemplary embodiment, may be performed, as shown in the flowcharts of FIGS. 5, 6, 7, 16A, and 16B which will be described below.

Figure 3:
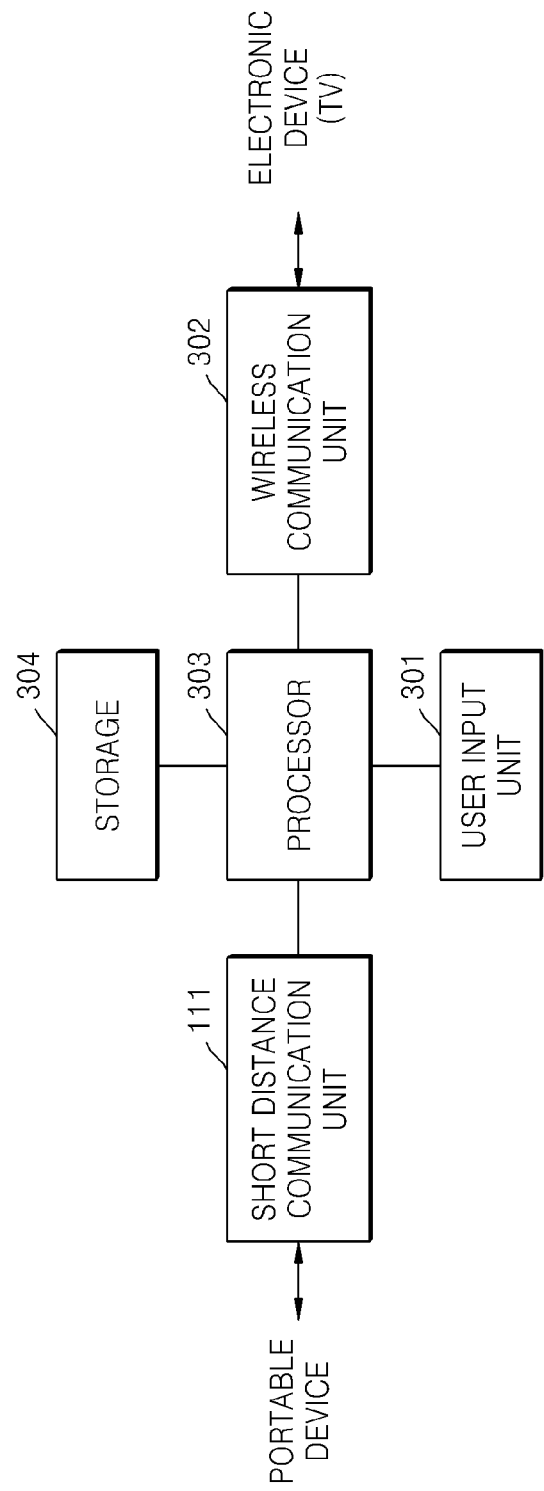
FIG. 3 is a functional block diagram which illustrates a remote control as shown in FIG. 1A, according to an exemplary embodiment.

FIG. 3 is a functional block diagram of the remote control 110 shown in FIG. 1A, according to an exemplary embodiment. Referring to FIG. 3, the remote control 110 includes the short distance communication unit 111, a user input unit 301, a wireless communication unit 302, a processor 303, and a storage 304.

The user input unit 301 may receive a key signal by using a key button.

The wireless communication unit 302 performs wireless communication in order to transmit data transmitted from the processor 303 to the electronic device 120.

When the remote control 110 includes an IrDA-based remote control that one-way communicates with the electronic device 120, the wireless communication unit 302 may include an infrared (IR) transmitter. When the wireless communication unit 302 includes the IR transmitter, the wireless communication unit 302 irradiates infrared rays to the electronic device 120 in order to transmit data to the electronic device 120. The data transmitted to the electronic device 120 is dependent upon the key signal received by the user input unit 301 or data received via the short distance communication unit 111.

In particular, when an occurrence of a short communication in conjunction with a contact between the short distance communication unit 111 and the short distance communication unit 101 or an approach between the short distance communication unit 111 and the short distance communication unit 101 at a predetermined adjacent distance is detected, data required for reproducing contents received from the portable device 100 is provided to the processor 303. The processor 303 transmits an infrared ray-type signal, which is required for transmitting the received data to the electronic device 120, to the wireless communication device 302. In response, the wireless communication unit 302 generates a pulse wave which corresponds to the infrared ray-type signal received from the processor 303 and irradiates infrared rays to the electronic device 120 in order to transmit data to the electronic device 120.

Alternatively, the processor 303 may be configured to transmit data received via the short distance communication unit 111 to the electronic device 120 when the processor 303 receives a data transmitting request signal via the user input unit 301. To this end, the processor 303 may store the received data in the storage 304.

In addition, the processor 303 may be configured to transmit a power-on request signal to the electronic device 120 via the wireless communication unit 302 when the processor 303 detects the occurrence of the short distance communication. In this case, the processor 303 may be configured to independently generate the above-described power-on request signal from a power-on request signal that is received by the electronic device 120 based on a control of a power on/off button (not shown) included in the user input device 301.

However, when the occurrence of the short distance communication is detected and data is received by the electronic device 120, a power-on request signal may also be transmitted to the electronic device 120. The electronic device 120 may recognize the received power-on request signal as a signal that is generated based on the occurrence of the short distance communication, and as a result, the electronic device 120 may be powered on in accordance with a power on/off state of the electronic device 120. In particular, when the electronic device 120 is in a power-on state, the received power-on request signal may be disregarded. When the electronic device 120 is in a power-off state, the electronic device 120 may be powered on in response the received power-on request signal.

When the remote control 110 is a radio frequency (RF) communication-based remote control that two-way communicates with the electronic device 120, the wireless communication unit 302 may include an RF module.

When the wireless communication unit 302 includes an RF module, the processor 303 may transmit data, which is required for reproducing contents that are received from the portable device 100 via the wireless communication unit 302, to the electronic device 120. In addition, the processor 303 may transmit a request for data required for reproducing contents to the electronic device 120 via the wireless communication unit 302, and may receive the data required for reproducing contents from the electronic device 120.

In addition, the processor 303 may monitor the power on/off state of the electronic device 120 by two-way communication with the electronic device 120 via the wireless communication unit 302, and may store the monitoring result in the storage 304. When the occurrence of the short distance communication is detected, the processor 303 may determine whether the power-on request signal to the electronic device 120 is generated, based on information relating to the power on/off state of the electronic device 120, which is stored in the storage 304. Then, the processor 303 may transmit the power-on request signal to the electronic device 120 via the wireless communication 302.

In addition, the processor 303 may be configured to independently generate the above-described power-on request signal and to transmit the power-on request signal to the electronic device 120 in conjunction with a detection of the occurrence of the short distance communication by using a power-on request signal that is received by the electronic device 120 based on a control of a power on/off button (not shown) which is included in the user input unit 301.

For convenience of description, thus far, the wireless communication unit 302 has been exemplified as an IR module or an RF module. However, the exemplary embodiments are not limited thereto. For example, the wireless communication unit 302 may be configured based on short distance communication such as Bluetooth. Thus, the wireless communication unit 302 may be integrated with the short distance communication unit 111 to constitute one chip.

Figure 4:
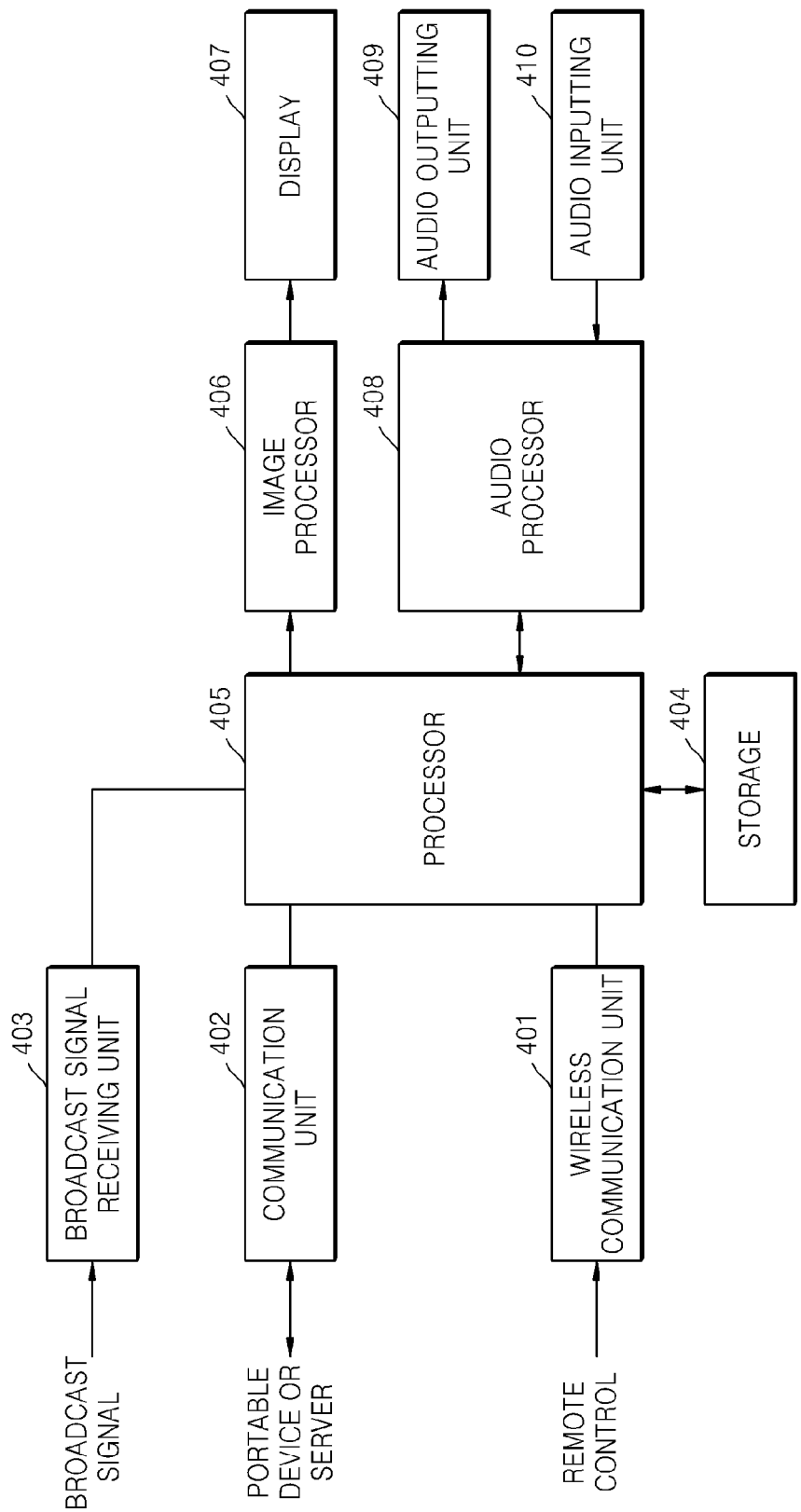
FIG. 4 is a functional block diagram which illustrates an electronic device as shown in FIG. 1A, according to an exemplary embodiment.

FIG. 4 is a functional block diagram of the electronic device 120 shown in FIG. 1A, according to an exemplary embodiment. In particular, FIG. 4 is a functional block diagram of a case in which the electronic device 120 includes a TV which has a communication function.

Referring to FIG. 4, the electronic device 120 includes a wireless communication unit 401, a communication unit 402, a broadcast signal receiving unit 403, a storage 404, a processor 405, an image processor 406, a display 407, an audio processor 408, an audio output unit 409, and an audio input unit 410.

The wireless communication unit 401 may be configured to communicate with the wireless communication unit 302 included in the remote control 110. In particular, when the wireless communication unit 302 includes an IR transmitter, the wireless communication unit 401 includes an IR receiver, receives an infrared signal transmitted from the wireless communication unit 302, demodulates the received infrared signal, and transmits the demodulated signal to the processor 405. However, when the wireless communication unit 302 includes an RF module, the wireless communication unit 401 includes an RF module, receives an RF signal transmitted from the wireless communication unit 302, and transmits the received RF signal to the processor 405. However, the wireless communication unit 401 is not limited to the above-described IR module and RF module. In particular, similarly as the wireless communication unit 302, the wireless communication unit 401 may be configured based on short distance communication such as Bluetooth.

The communication unit 402 performs wireless data communication with at least one of the portable device 100 and the server 130 via a wireless communication module. The electronic device 120 may data-communicate with the portable device 100 or the server 130 by using at least one of a wireless communication-based network such as Bluetooth, RFID, WiFi, IrDA, UWB, ZigBee, and NFC, a wired communication-based network such as home phoneline networking alliance (PNA), power line communication (PLC), IEEE 1394, and wired Internet, and/or various home networks.

The processor 405 may receive contents or data required for reproducing contents from at least one of the portable device 100 and the server 130 via the communication unit 402. The processor 405 may include at least one processor, such as the processor 210 shown in FIG. 2.

The broadcast signal receiving unit 403 divides a broadcast signal received via a tuner (not shown) into an image signal and an audio signal and outputs the image signal and the audio signal. In particular, the tuner selects an RF broadcast signal, which corresponds to a channel selected by a user or any channel that is previously stored, from among RF broadcast signals received via an antenna. In addition, the tuner converts the selected RF broadcast signal into at least one of an intermediate frequency signal, a base band image, and an audio signal. The at least one of the intermediate frequency signal, the base band image, and the audio signal is transmitted to the processor 405.

The storage 404 may store at least one program for controlling and processing various signals in the processor 405 and may store information relating to an authentication of the portable device 100, device-specific information relating to the electronic device 120, and user information relating to the electronic device 120.

The processor 405 controls an overall function of an electronic device 120. The processor 405 may control the electronic device 102 to transmit and receive data to and from the portable device 100 via the communication unit 402. The at least one program stored in the storage 404 may be loaded in order to configure a user interface (UI) image according to an exemplary embodiment, and the UI image may be displayed on the display 407 via the image processor 406.

According to an exemplary embodiment, the UI image may include a UI image (or UI menu screen) which facilitates a user selection of contents to be reproduced. The UI image which facilitates the selection of contents to be reproduced may be generated by the processor 405 when the electronic device 120 reproduces contents and receives data required for reproducing contents via at least one of the wireless communication device 401 and the communication device 402 in conjunction with an occurrence of a short distance communication between the portable device 100 and the remote control 110.

In addition, after the electronic device 120 is powered on, the UI image may include a first menu image. If a power-on state of the electronic device 120 is caused by the occurrence of the short distance communication between the remote control 110 and the portable device 100, the first menu image may include an item which facilitates a user selection relating to whether a seamless playback of contents that are being reproduced by the portable device 100 is performed, all contents are reproduced, or additional information is viewed or is stored for performing a seamless playback later.

If the power-on state of the electronic device 120 is caused by the occurrence of the short distance communication, data received from the remote control 110 or the portable device 100 may include a contents list which is stored in the portable device 100, which does not correspond to data that is not related to the contents that are being reproduced by the portable device 100. In this case, the first menu image may include the contents list. Thus, a user may select desired contents based on the contents list provided via the first menu image.

However, if the power-on state of the electronic device 120 is not caused by the occurrence of the short distance communication and there is stored information which relates to a later performance of a seamless playback, the first menu image may include an item which facilitates a user selection relating to whether a seamless playback of contents is performed.

The image processor 406 includes an image decoder (not shown) and a scaler (not shown). The image processor 406 may process an image output from the broadcast signal receiving unit 403 in order to display the image on a screen. The image decoder decodes a demultiplexed image signal. The scaler performs scaling in order to output resolution of the decoded image signal from the display 407. The image decoder may include various standards of decoders. For example, when the demultiplexed image signal is an image signal which complies with an MPEG-2 standard, the demultiplexed image signal may be decoded by an MPEG-2 decoder. For example, when the demultiplexed image signal is a decoded image signal which complies with an H.264 standard in accordance with a digital multimedia broadcasting (DMB) method or DVB-H, the demultiplexed image signal may be decoded by an H.264 decoder.

The display 407 may output an image which has been processed by the image processor 406. The output image may include at least one of an image which has been received from the broadcast signal receiving unit 403, a UI image, and an image which includes contents that are received from the portable device 100 or the server 130 via the communication unit 402. However, the display 407 may include a touch screen and may be used as an input device.

The audio processor 408 processes at least one of an audio signal which has been output from the broadcast signal receiving unit 403 and an audio signal which is contained in contents received via the communication unit 402, and transmits the processed audio signals to the audio output unit 409. The audio output unit 409 may be configured in various ways, and for example, may output at least one of a stereo signal, a 3.1 channel signal, and a 5.1 channel signal.

In addition, the audio processing unit 408 may process a signal which has been received from the audio input unit 410 and may transmit the processed signal to the processor 405. The audio input unit 410 may include a microphone.

Figure 5:
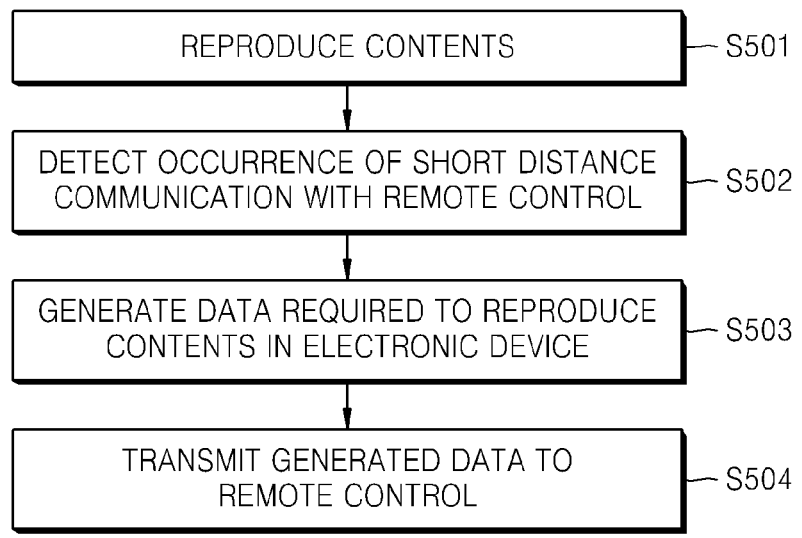
FIG. 5 is a flowchart which illustrates a contents reproducing method which is executable by using the portable device, according to an exemplary embodiment.

FIG. 5 is a flowchart which illustrates a contents reproducing method which is executable by using the portable device 100, according to an exemplary embodiment. The method of FIG. 5 may be performed by the processor 210 shown in FIG. 2.

In operation S501, the portable device 100 reproduces contents on the touch screen 203. Then, after detecting an occurrence of a short distance communication in operation S502 by using the remote control 110, which controls the electronic device 120 via the short distance communication unit 101, in operation S503, the processor 210 generates data required by the electronic device 120 for reproducing the contents that are being reproduced on the touch screen 203. The generated data includes at least one of contents provider information, device-specific information relating to the portable device 100, user information relating to the portable device 100, meta data relating to the contents, and information relating to a time when the contents are reproduced, which corresponds to a time when the occurrence of the short distance communication is detected.

Then, in operation S504, the processor 210 transmits the generated data to the remote control 110 via the short distance communication unit 101. The short distance communication unit 101 converts the generated data into a message which has a short distance communication data exchange format and transmits the message having the short distance communication data exchange format to the remote control 110.

Figure 6:
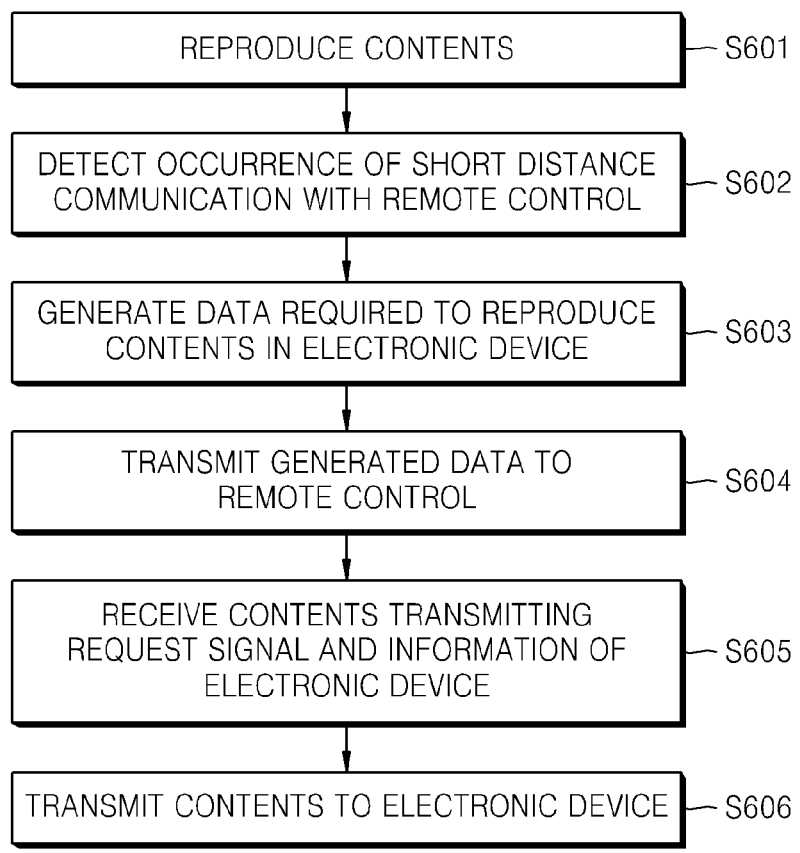
FIG. 6 is a flowchart which illustrates a contents reproducing method which is executable by using the portable device, according to another exemplary embodiment.

FIG. 6 is a flowchart which illustrates a contents reproducing method which is executable by using the portable device 100, according to another exemplary embodiment. The method of FIG. 6 may be performed by the processor 210 shown in FIG. 2. Respective operations S601, S602, S603, and S604 of FIG. 6 are the same as corresponding operations S501, S502, S503, and S504 of FIG. 5, respectively, and thus, their detailed description will be omitted.

In operation S604, the processor 210 transmits the generated data to the remote control 110 via the short distance communication unit 101, and then, in operation S605, the processor 210 receives a contents transmitting request signal from the electronic device 120 and information relating to the electronic device 120 from the electronic device 120 via the communication unit 208. The contents transmitting request signal and the information relating to the electronic device 120 may be received from the remote control 110 via the short distance communication unit 101. Thus, in operation S606, the processor 210 transmits contents to the electronic device 120 via the communication unit 208 by using the received information relating to the electronic device 120.

In this case, the processor 210 may output a message indicating a transmission state of contents, such as, for example, "transmitting contents," to the touch screen 203, or may output a message indicating a transmission state of contents, including various steps such as, for example, "begin transmitting of contents," "transmitting contents," and "finish transmitting of contents." When the message indicating the transmission state of contents, including the various steps, is displayed on the touch screen 203, the processor 210 may monitor an amount of data in the contents to be transmitted and a communication speed of the communication unit 208, and may control a time when the message is output.

Figure 7:
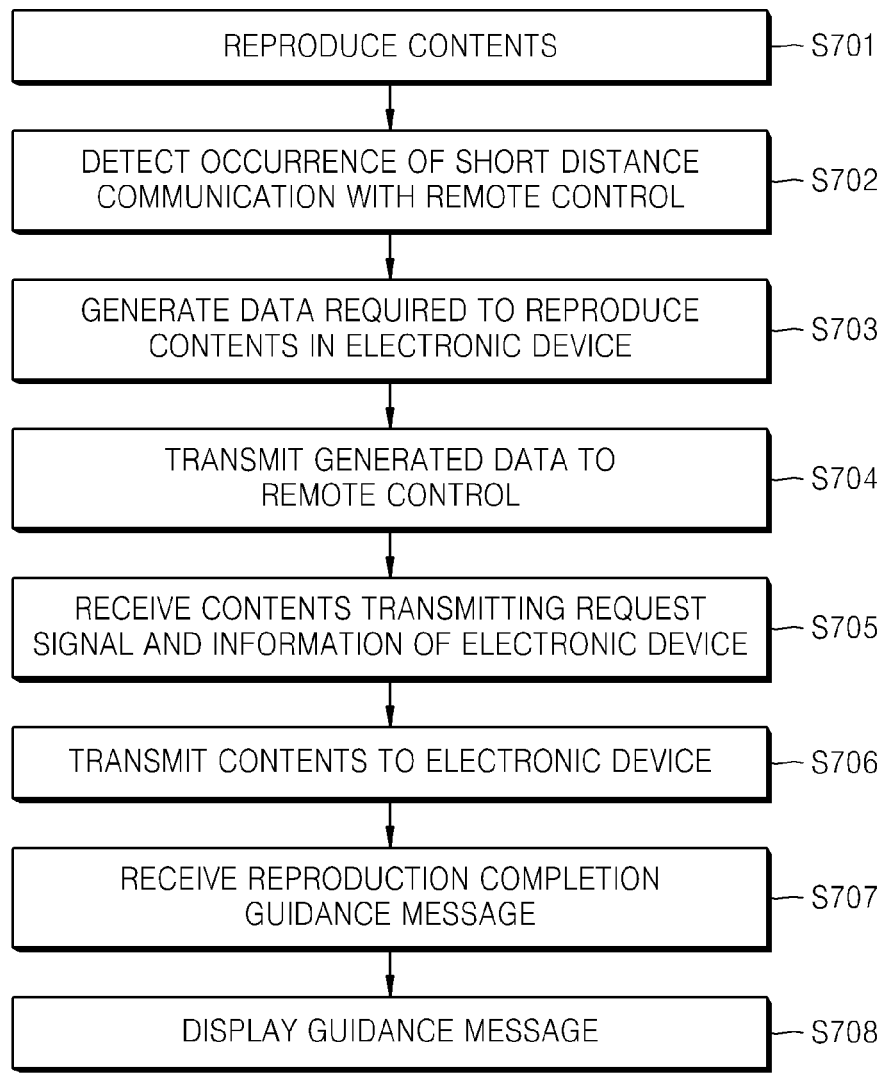
FIG. 7 is a flowchart which illustrates a contents reproducing method which is executable by using a portable device, according to another exemplary embodiment.

FIG. 7 is a flowchart which illustrates a contents reproducing method which is executable by using the portable device 100, according to another exemplary embodiment. The method of FIG. 7 may be performed by using the processor 210 shown in FIG. 2. Respective operations S701, S702, S703, S704, S705, and S706 of FIG. 7 are the same as corresponding operations S601, S602, S603, S604, S605, and S606 of FIG. 6, respectively, and thus, their detailed description will be omitted.

When the processor 210 receives a reproduction completion guidance message from the electronic device 120 via the communication unit 208 in operation S707, the processor 210 displays the received reproduction completion guidance message on the touch screen 203 in operation S708.

Figure 8:
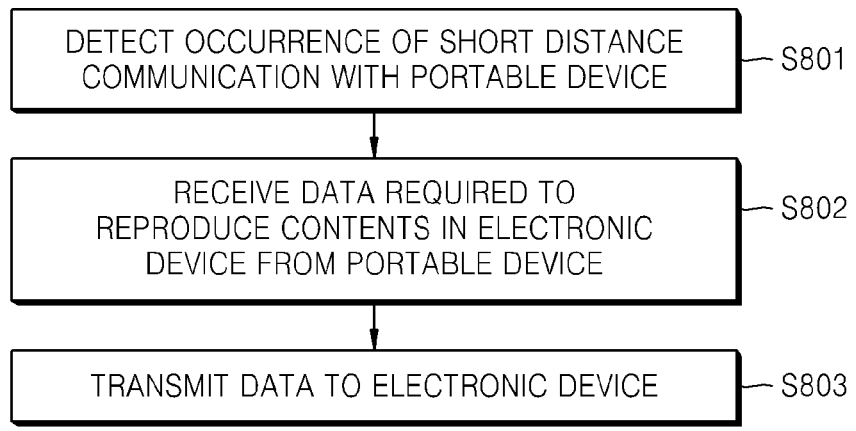
FIG. 8 is a flowchart which illustrates a contents reproducing method which is executable by using the remote control which is configured to control the electronic device, according to an exemplary embodiment.

FIG. 8 is a flowchart which illustrates a contents reproducing method which is executable by using the remote control 110 which is configured to control the electronic device 120, according to an exemplary embodiment. The method of FIG. 8 may be performed by the processor 303 shown in FIG. 3.

Referring to FIG. 8, in operation S801, the processor 303 detects an occurrence of a short distance communication between the portable device 100 and the remote control 110 via the short distance communication unit 111, and then, in operation S802, the processor 303 receives data required by the electronic device 120 for reproducing contents that are being reproduced by the portable device 100 in the electronic device 120 from the portable device 100 via the short distance communication unit 111. In conjunction with the detection of the occurrence of short distance communication, the processor 303 may transmit a power-on request signal to the electronic device 120. Thus, the electronic device 120 may recognize the power-on request signal and the occurrence of the short distance communication and may control a power-on state of the electronic device 120, which will be described below with reference to FIG. 12.

In operation S803, the processor 303 transmits received data to the electronic device 120 via the wireless communication unit 302. The received data is transmitted to the electronic device 120 in response to a data transmission request signal which is received via the user input unit 301 of the remote control device 110. In addition, the received data is converted into data having a compatible format based on a data exchange format between the electronic device 120 and the remote control 110 in the wireless communication unit 302, and is then transmitted to the electronic device 120.

As described with reference to FIG. 3, the processor 303 may transmit a power-on request signal relating to the electronic device 120 before or when the received data is transmitted to the electronic device 120.

Figure 9:
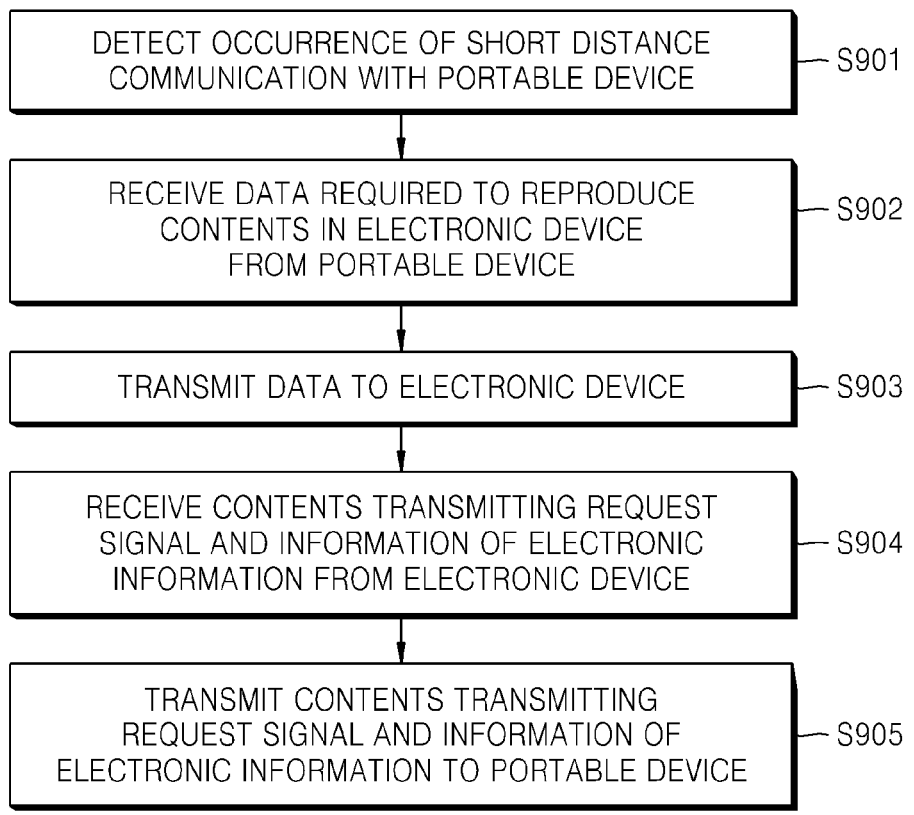
FIG. 9 is a flowchart which illustrates a contents reproducing method which is executable by using the remote control which is configured to control the electronic device, according to another exemplary embodiment.

FIG. 9 is a flowchart which illustrates a contents reproducing method which is executable by using the remote control 110 which is configured to control the electronic device 120, according to another exemplary embodiment. The method of FIG. 9 may be performed by the processor 303 shown in FIG. 3. Respective operations S901, S902, and S903 of FIG. 9 are the same as corresponding operations S801, S802, and S803 of FIG. 8, respectively, and thus, their detailed description will be omitted.

In operation S904, the processor 303 receives a contents transmitting request signal and information relating to the electronic device 120 from the electronic device 120 via the wireless communication unit 302, and then, in operation S905, the processor 303 transmits the contents transmitting request signal and the information relating to the electronic device 120 to the portable device 100 via the short distance communication unit 111.

Figure 10:
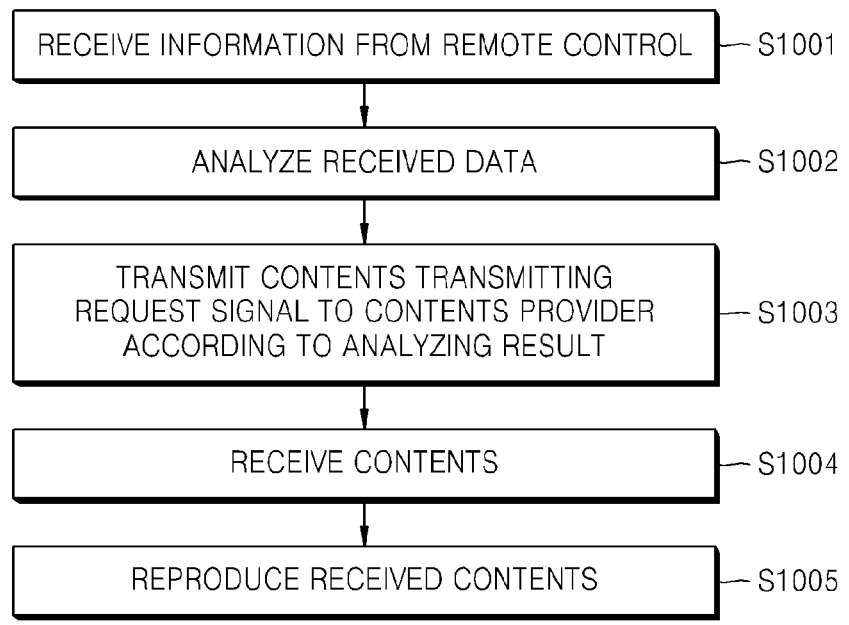
FIG. 10 is a flowchart which illustrates a contents reproducing method which is executable by using the electronic device, according to an exemplary embodiment.

FIG. 10 is a flowchart which illustrates a contents reproducing method which is executable by using the electronic device 120, according to an exemplary embodiment. The method of FIG. 10 may be performed by the processor 405 shown in FIG. 4.

In operation S1001, the processor 405 receives information from the remote control 110 via the communication unit 402. In operation S1002, the processor 405 analyzes received data. In operation S1003, the processor 405 transmits a contents transmitting request signal to a contents provider based on a result of analyzing the data. When the result of the analyzing indicates that the contents provider is the server 130, the processor 405 transmits the contents transmitting request signal to the server 130 via the communication unit 402. When the result of the analyzing indicates that the contents provider is the portable device 100, the processor 405 transmits the contents transmitting request signal to the portable device 100 via the communication unit 402. When the result of the analyzing indicates that the contents provider includes both of the server 130 and the portable device 100, the processor 405 outputs a UI image (or UI menu screen) to the display 407 such that a user may select a contents provider.

In operation S1004, the processor 405 receives contents from the contents provider to which the contents transmitting request signal has been transmitted, via the communication unit 402. In operation S1005, when the received contents are combined with an image signal and an audio signal, the processor 405 reproduces the image signal by using the image processor 406 and the display 407, and reproduces the audio signal by using the audio processor 408 and the audio output unit 409.

In this case, when the received contents have a plurality of resolutions, the processor 405 first receives information relating to the plurality of resolutions via the communication unit 402. The processor 405 may display a UI image (or UI menu screen) which shows a user the information relating to the plurality of resolutions on the display 407. Thus, when a user selects one resolution, information relating to the selected resolution is transmitted to the contents provider, and thus contents having the resolution selected by the user may be received.

However, when the received contents have a plurality of resolutions and the contents provider has information relating to a resolution of the electronic device 120, the processor 405 may receive contents suitable for the resolution of the electronic device 120 via the communication 402, and may directly reproduce the contents by using the image processor 406 and the display 407.

Figure 11:
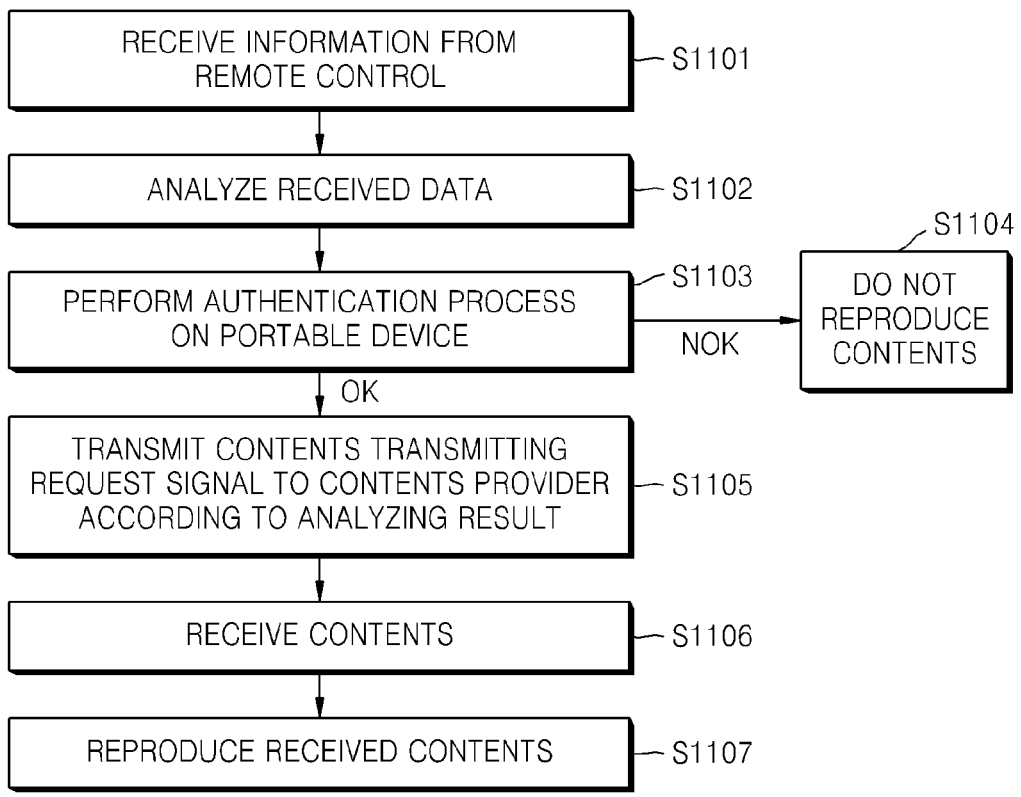
FIG. 11 is a flowchart which illustrates a contents reproducing method which is executable by using an electronic device, according to another exemplary embodiment.

FIG. 11 is a flowchart which illustrates a contents reproducing method which is executable by using the electronic device 120, according to another exemplary embodiment. The method of FIG. 11 may be performed by the processor 405.

Similarly as described above with respect to operation S1001, in operation S1101, the processor 405 receives information from the remote control device 110 via the wireless communication unit 401, and then, in operation S1102, the processor 405 analyzes received data.

In operation S1103, the processor 405 performs an authentication process relating to the portable device 100 by using data relating to the authentication process which has been detected from the analyzed data. In particular, the processor 405 compares information relating to authentication that has previously been stored in the storage 404 with the data relating to the authentication process which has been detected from the analyzed data. If the previously stored information relating to authentication is not identical to the detected data relating to the authentication process, then in operation S1104, the processor 405 does not perform a seamless playback of contents. The data relating to the authentication process may include, for example, at least one of device-specific information relating to the portable device 100 and user information relating to the portable device 100. The authentication process may refer to an authentication process relating to whether or not a seamless playback of contents is allowed.

However, as a result of the authentication process, when the device-specific information relating to the portable device 100 or the user information relating to the portable device 100, which is contained in the analyzed data, is identical to the previously stored information relating to authentication, then in operation S1105, the processor 405 transmits the contents transmitting request signal to the contents provider via the communication device 208 in accordance with the analyzing result.

Thus, in operation S1106, the processor 405 receives contents from the contents provider via the communication unit 208, and then, in operation S1107, the processor 405 reproduces the received contents by using the image processor 406, the display 407, the audio processor 408, and the audio output unit 409, similarly as described above.

Figure 12:
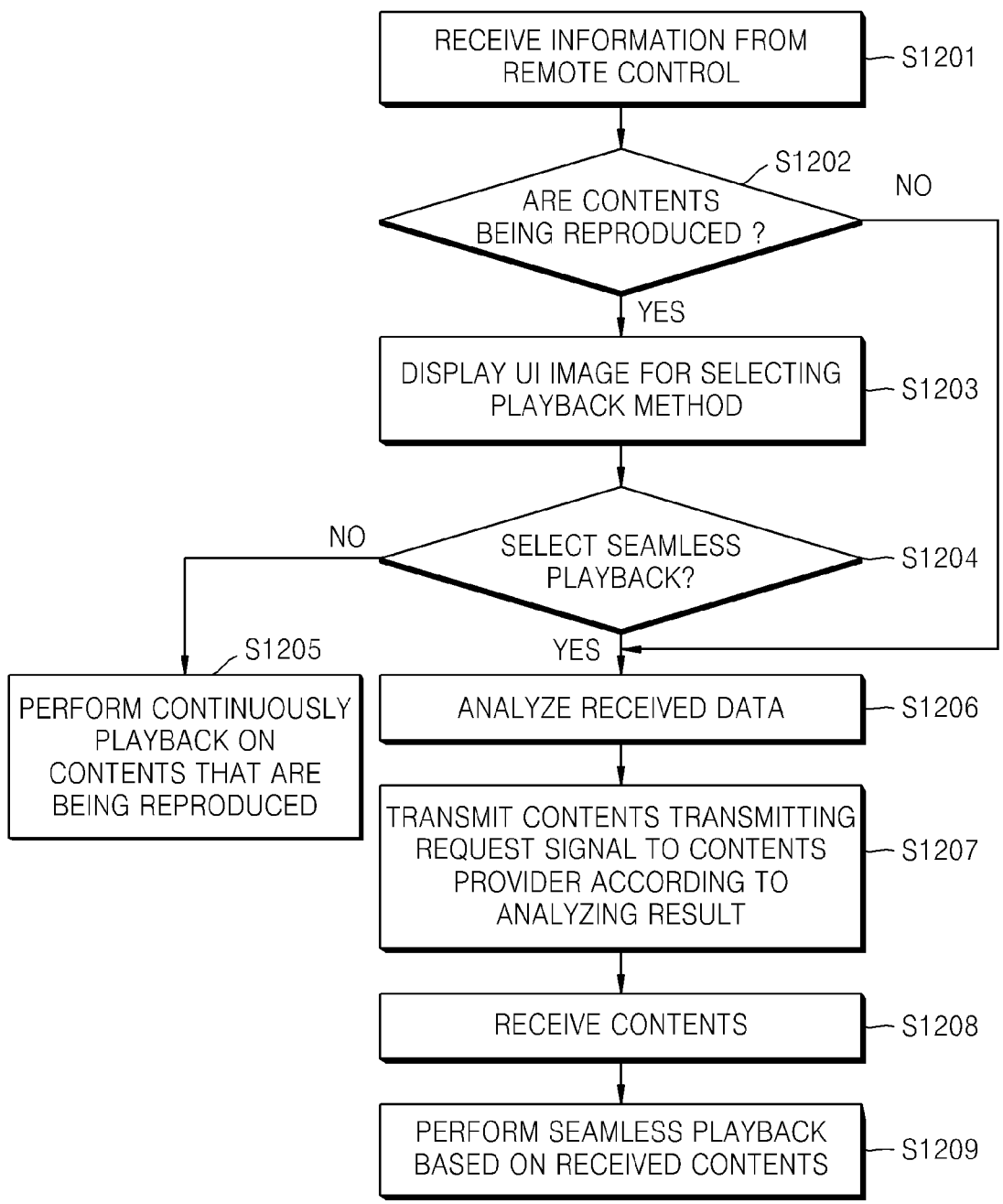
FIG. 12 is a flowchart which illustrates a contents reproducing method which is executable by using an electronic device, according to another exemplary embodiment.

FIG. 12 is a flowchart which illustrates a contents reproducing method which is executable by using the electronic device 120, according to another exemplary embodiment. FIG. 12 shows a case in which an occurrence of a short distance communication between the remote control 110 and the portable device 100 is detected when the electronic device 120 reproduces contents.

In operation S1201, the processor 405 receives information from the remote control 110 via the wireless communication unit 401 in conjunction with the occurrence of the short distance communication. If a determination is made in operation S1202 that contents are being reproduced by using at least one of the image processor 406, the display 407, the audio processor 408, and the audio output unit 409, as described above, then in operation S1203, a UI image (or UI menu screen) which facilitates a selection relating to a playback method, and in particular, whether contents that are currently being reproduced shall be reproduced or whether a seamless playback of contents reproduced by the portable device 100 shall be performed, is output to the display device 407.

When user input information that is received from the remote control 110 via the wireless communication device 401 does not indicate a selection relating to the seamless playback of contents, then in operation S1205, the processor 405 continuously reproduces contents that are currently being reproduced. Conversely, when the user input information that is received from the remote control 110 via the wireless communication unit 401 indicates a selection relating to the seamless playback of contents, then in operation S1206, the processor 405 analyzes data that is received via the communication unit 402, and then performs respective operations S1207, S1208, and S1209, which are similar to the above-described corresponding operations S1105, S1106, and S1107 of FIG. 11.

In operation S1201 of FIG. 12, when information is received from the remote control 110 via the wireless communication unit 401 in conjunction with an occurrence of a short distance communication, a power-on request signal which relates to the electronic device 120 may be contained in the received information. In this case, as described above, the processor 405 may recognize the power-on request signal in conjunction with the occurrence of the short distance communication, instead of a general power-on request signal. Thus, when the processor 405 is in a power-on state, the processor 405 disregards the power-on request signal which is received via the wireless communication unit 401. However, when the processor 405 is in a power-off state, the processor 405 may be powered on. In particular, the electronic device 120 may determine whether the power-on request signal is accepted based on a power on/off state of the electronic device 120.

In addition, when contents that are subject to a seamless playback are general broadcast signals, the processor 405 may set a broadcast channel based on the analyzing result obtained in operation S1206 and may receive a broadcast signal via the broadcast signal receiving unit 403 in operation S1208.

Figure 13:
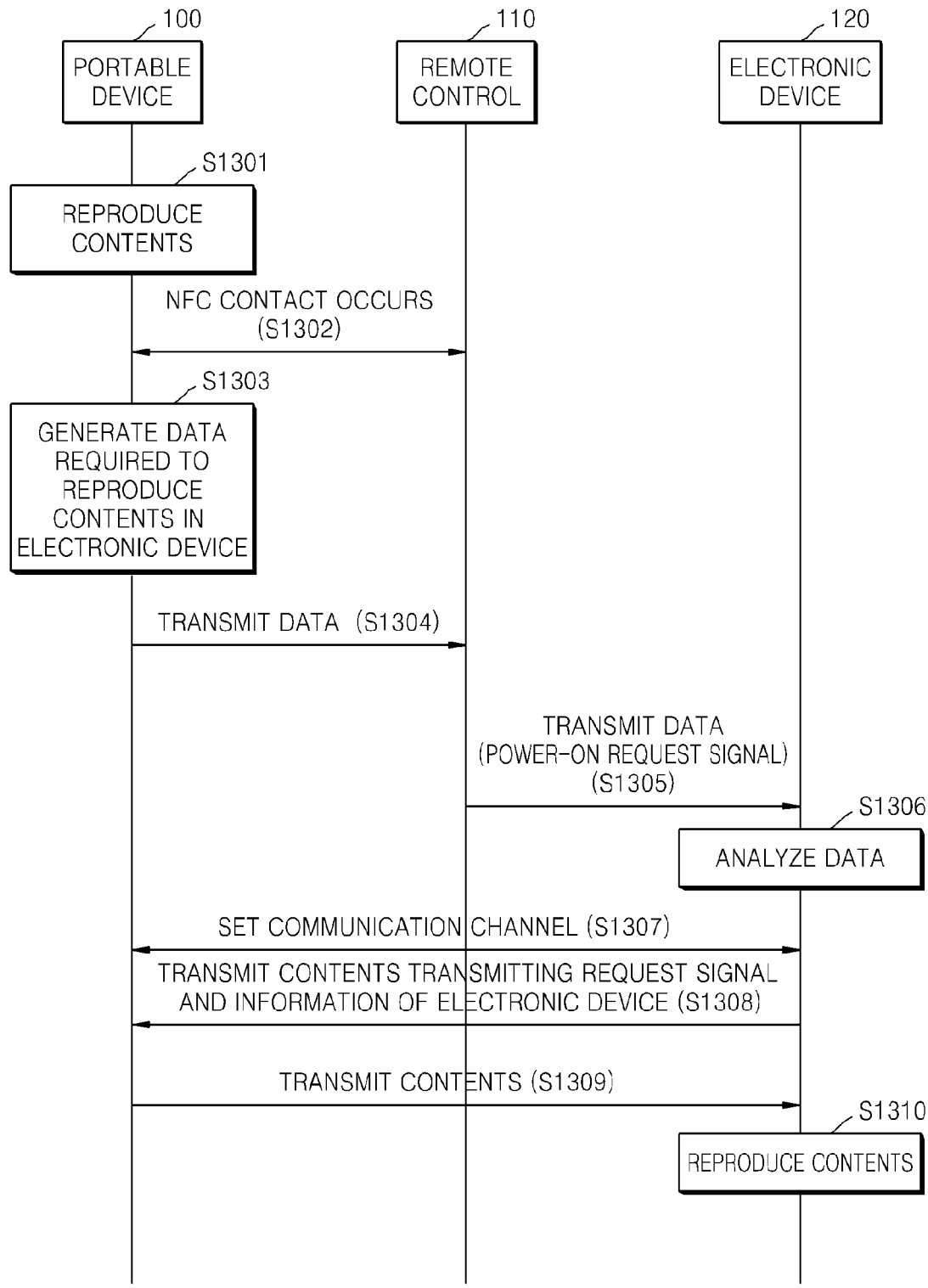
FIG. 13 is a flowchart which illustrates operations between the portable device, the remote control, and the electronic device, according to an exemplary embodiment.

FIG. 13 is a flowchart which illustrates operations between the portable device 100, the remote control 110, and the electronic device 120 when the electronic device 120 performs a seamless playback on contents that are being reproduced by the portable device 100 and provides a request for contents to the portable device 100, according to an exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120 as shown in FIGS. 2, 3, and 4.

When the portable device 100 reproduces contents in operation S1301, if an NFC contact between the portable device 100 and the remote control device 110 occurs in operation S1302, then in operation S1303, the portable device 100 generates data required by the electronic device 120 for reproducing contents. The generated data may include the generated data described above with reference to FIG. 5.

In operation S1304, the portable device 100 transmits data to the remote control device 110. In operation S1305, the remote control 110 transmits the received data to the electronic device 120. In this case, the power-on request signal may also be transmitted to the electronic device 120, as described above with reference to FIG. 3. In addition, in operation S1305, when data is transmitted from the remote control 110 to the electronic device 120, the data may be converted into a communication data exchange format which is mutually compatible between the remote control 110 and the electronic device 120, and the converted data may be transmitted to the electronic device 120.

Thus, in operation S1306, the electronic device 120 converts the received data into a format which is suitable for the electronic device 120 and analyzes the received data for which the format has been converted.

When, in accordance with a result of the analyzing in operation S1306, the electronic device 120 determines to receive contents from the portable device 100, then in operation S1307, the electronic device 120 sets a channel for communication with the portable device 100. In this case, when the electronic device 120 has not previously set a function for communicating with the portable device 100, the electronic device 120 may activate the communication function based on communication function information relating to the portable device 100, which is contained in the analyzed data, and may set a communication channel. For example, when the communication function corresponds to WiFi direct, the electronic device 120 may activate a WiFi direct function and may set a communication channel, based on WiFi direct information included in information which is received from the portable device 100.

After the communication channel is set, in operation S1308, the electronic device 120 transmits the contents transmitting request signal and information relating to the electronic device 120 to the portable device 100 by using the set communication channel. Thus, when contents are transmitted by the portable device 100 in operation S1309, after receiving the transmitted contents, the electronic device 120 reproduces the contents in operation S1310. The communication channel may be set by using a short distance communication protocol, such as, for example, Bluetooth, in addition to the above-described WiFi direct.

Figure 14:
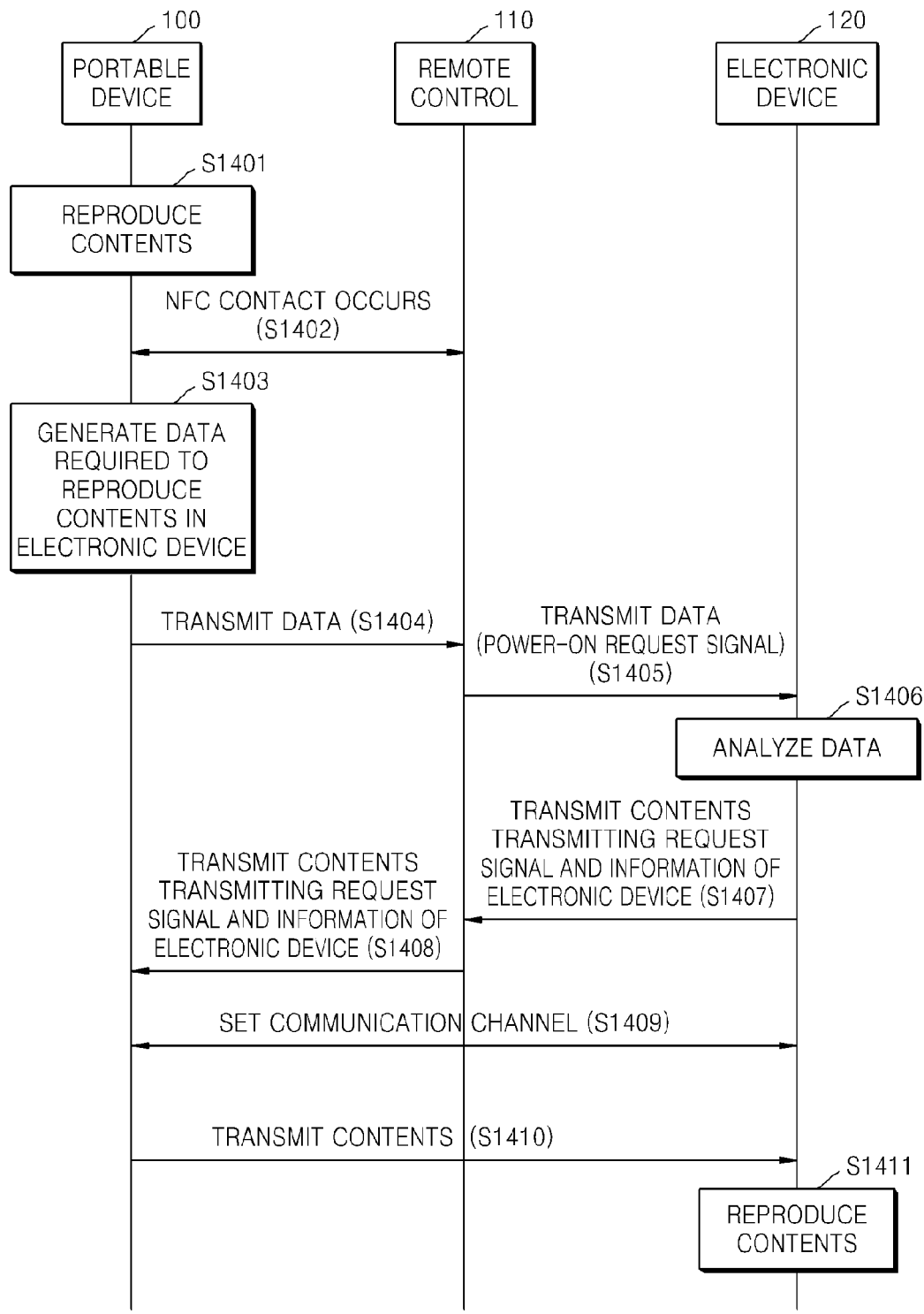
FIG. 14 is a flowchart which illustrates operations between the portable device, the remote control, and the electronic device, according to another exemplary embodiment.

FIG. 14 is a flowchart which illustrates operations between the portable device 100, the remote control 110, and the electronic device 120 when the electronic device 120 performs a seamless playback on contents that are being reproduced by the portable device 100 and provides a request for contents to the portable device 100, according to another exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

In FIG. 14, a contents transmitting request signal generated by the electronic device 120 and information relating to the electronic device 120 are transmitted to and received by the portable device 100 via the remote control 110. Thus, respective operations S1401, S1402, S1403, S1404, S1405, and S1406 of FIG. 14 correspond to respective operations S1301, S1302, S1303, S1304, S1305, and S1306 of FIG. 13, respectively, and thus, their detailed description will be omitted.

In operation S1407, when the electronic device 120 determines to receive contents from the portable device 100, the electronic device 120 transmits a contents transmitting request signal and information relating to the electronic device 120 to the remote control 110, which then transmits the contents transmitting request signal and the information relating to the electronic device to the portable device in operation S1408. Thus, in operation S1409, based on the request received by the portable device 100, a communication channel between the portable device 100 and the electronic device 120 is set. In this case, when the portable device 100 has not previously set a function for communicating with the electronic device 120, the portable device 100 may activate the communication function based on the received information relating to the electronic device 120 and may set a communication channel. In particular, similarly as described above with respect to FIG. 13, when communication function information contained in the information relating to the electronic device 120 corresponds to WiFi direct, the portable device 100 may activate the WiFi direct function based on the information relating the electronic device 120, which is received from the remote control 110, and may set the communication channel accordingly.

After the communication channel is set, in operation S1410, the portable device 100 transmits contents to the electronic device 120, and the electronic device 120 then reproduces the contents in operation S1411. The communication channel may be set by using a short distance communication protocol, such as, for example, Bluetooth in addition to the above-described WiFi direct.

Figure 15:
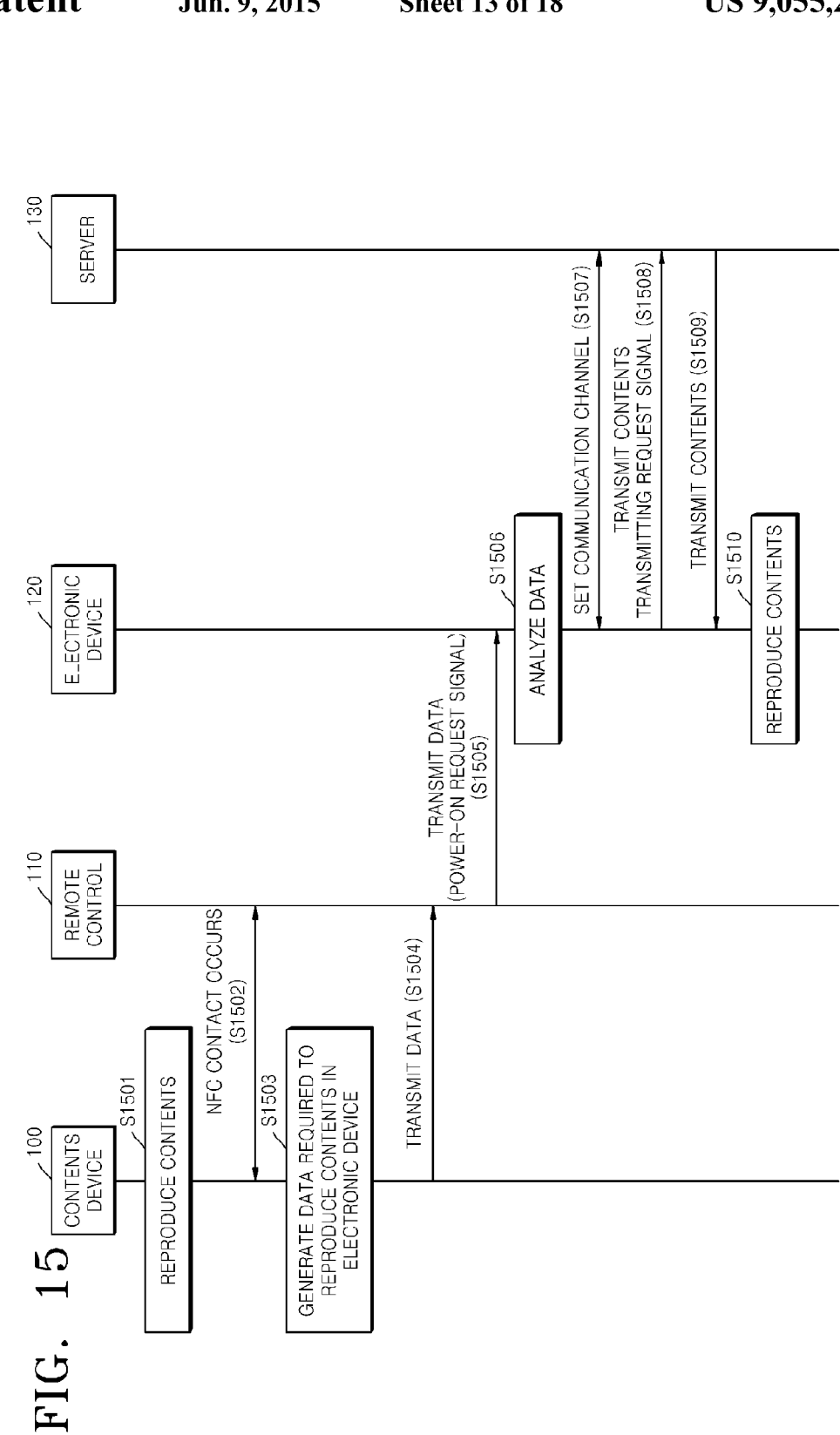
FIG. 15 is a flowchart which illustrates operations between the portable device, the remote control, the electronic device, and a server, according to an exemplary embodiment.

FIG. 15 is a flowchart which illustrates operations between the portable device 100, the remote control device 110, the electronic device 120, and the server 130 when the electronic device 120 provides a request for contents to the server 130, according to an exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Respective operations S1501, S1502, S1503, S1504, S1505, and S1506 of FIG. 15 correspond to respective operations S1301, S1302, S1303, S1304, S1305, and S1306, of FIG. 13, respectively, and thus, their detailed description will be omitted.

In operation S1507, when the electronic device 120 determines to receive contents from the server 130, the electronic device 120 sets a communication channel with the server 130. In order to set the communication channel between the electronic device 120 and the server 130, data may be transmitted and received between the electronic device 120 and the server 130.

After the communication channel is set, in operation S1508, the electronic device 120 transmits the contents transmitting request signal to the server 130. Thus, the server 130 searches for contents by using meta data relating to contents indicated in the received contents transmitting request signal and, in operation S1509, transmits the contents which are identified as a result of the searching to the electronic device 120. Then, in operation S1510, the electronic device 120 reproduces the received contents.

FIGS. 5 through 15 show respective cases in which, when the portable device 100 reproduces contents, in conjunction with an occurrence of a short distance communication, such as an NFC contact, between the portable device 100 and the remote control 110, the electronic device 120 performs a seamless playback of contents that are being reproduced by the portable device 100.

However, the above-described exemplary embodiments may also be applied to contents that are in a pause state in the portable device 100, instead of the above-described contents that are being reproduced by the portable device 100. In this case, the generated data may include information relating to a time when contents are reproduced, which corresponds to a pause time.

FIGS. 16A, 16B, 17, 18, 19, 20, and 21 are flowcharts which illustrate respective cases in which the portable device 100 performs a seamless playback when the electronic device 120 reproduces contents, in conjunction with an occurrence of a short distance communication, such as an NFC contact, between the remote control 110 and the portable device 100, according to exemplary embodiments.

Figure 16A:
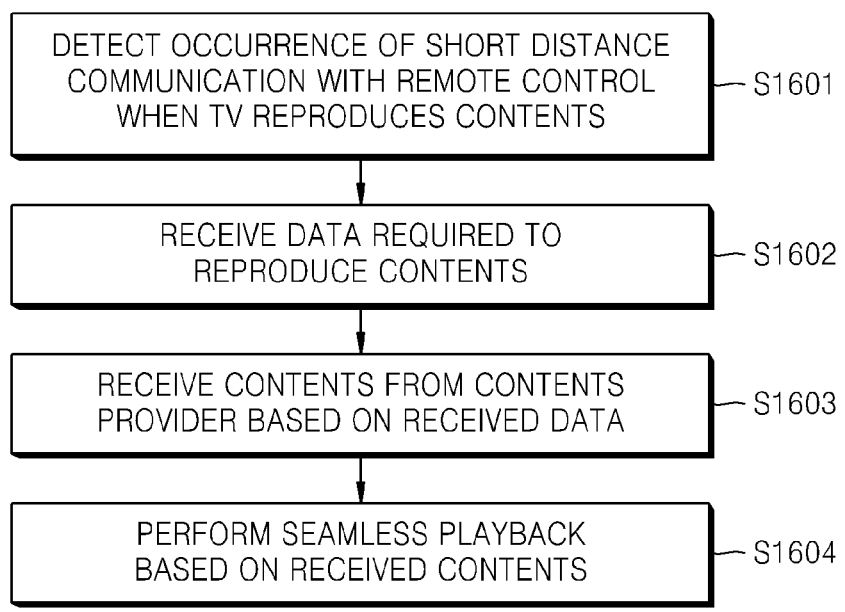
FIG. 16A is a flowchart which illustrates a contents reproducing method which is executable by using the portable device, according to another exemplary embodiment.

FIG. 16A is a flowchart which illustrates an operation the portable device 100, according to an exemplary embodiment. The operation of FIG. 16A may be performed by the processor 210.

In operation S1601, the electronic device 120 reproduces contents and the communication unit 208 detects an occurrence of a short distance communication between the remote control 110 and the portable device. Then, in operation S1602, the processor 210 receives data required by the portable device 100 for reproducing the contents that are being reproduced by the electronic device 120 from the remote control 110 via the communication unit 208, or receives the data from the electronic device 120 via the remote control 110. The received data may include at least one of contents provider information, device information relating to the electronic device 120, user information relating to the electronic device 120, meta data relating to the contents, and information relating to a time when the contents are reproduced, which corresponds to a time when an occurrence of a short distance communication is detected.

The processor 210 performs an authentication process which relates to the electronic device 120 by using at least one of the device information relating to the electronic device 120 and the user information relating to the electronic device 120, at least one of which is contained in the received data. The authentication process may be performed by comparing the user information relating to the electronic device 120 or the device information relating to the electronic device 120, which have previously been stored in the storage 207, with the received information. The authentication process may refer to an authentication process which relates to whether or not a seamless playback of contents is allowed. When authentication is successful, in operation S1603, the processor 210 receives the contents from a contents provider based on the data received via the communication unit 208. However, when authentication fails, the processor 210 does not perform a seamless playback of the contents.

Figure 16B:
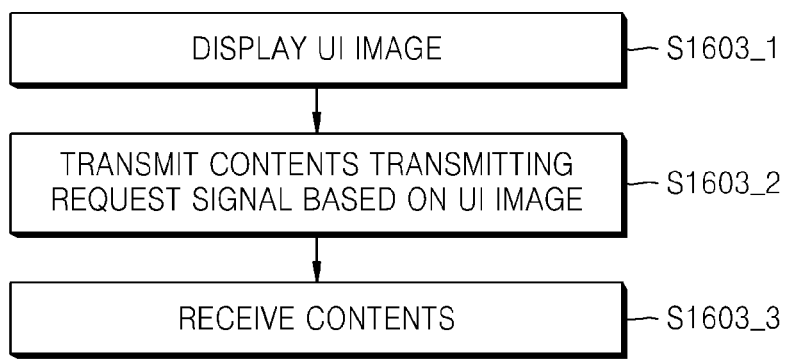
FIG. 16B is a detailed flowchart which illustrates an operation of receiving contents from a contents provider as shown in FIG. 16A, according to an exemplary embodiment.

The receiving of the contents in operation S1603 may be performed in accordance with operations which are illustrated in FIG. 16B. FIG. 16B is a detailed flowchart which illustrates an operation of receiving contents from a contents provider, according to an exemplary embodiment.

Referring to FIG. 16B, in operation S1603_1, the processor 210 displays a UI image (or a UI menu screen) on the touch screen 203 via which a contents provider may be selected based on the data received via the short distance communication unit 101, on the touch screen 203. When a selection of the contents provider is detected based on the UI image via the touch screen 203, in operation S1603_2, the processor 210 transmits a contents transmitting request signal to the selected contents provider via the communication unit 208. Thus, in operation S1603_3, the processor 210 receives contents from the selected contents provider via the communication unit 208.

Referring to FIG. 16A, when the received contents are combined with an image signal and an audio signal, in operation S1604, the processor 210 performs a seamless playback based on the received contents via the touch screen 203 and the audio output unit 206. When the received contents include the image signal, the processor 210 reproduces the received contents via the touch screen 203. The received contents may be reproduced by using the data required for reproducing the content, which data is received in operation S1602.

Subsequent operations to the above-described operation S1602 may be performed based on a contents reproducing request signal that is received via at least one of the user input unit 201, the touch screen 203, the sensor 202, and the audio input unit 205 of the portable device 100.

Figure 17:
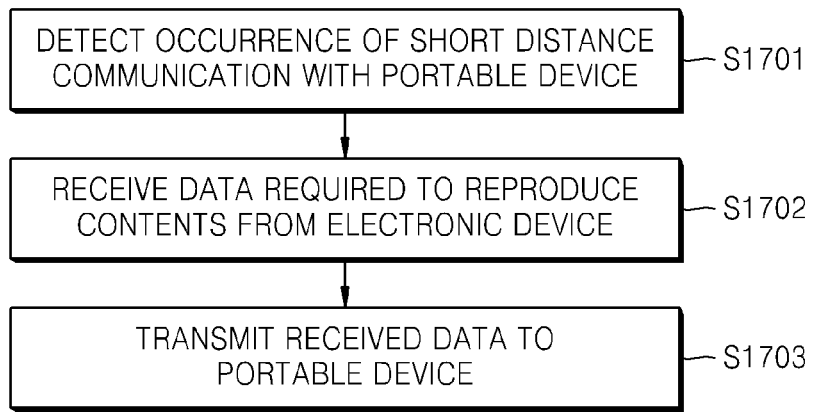
FIG. 17 is a flowchart which illustrates an operation of the remote control, according to another exemplary embodiment.

FIG. 17 is a flowchart which illustrates an operation which is executable by using the remote control 110, according to another exemplary embodiment. The operation of FIG. 17 may be performed by the processor 303.

In operation S1701, the processor 303 detects an occurrence of a short distance communication between the portable device 100 and the remote control device 110 via the short distance communication unit 111, and, then, in operation S1702, the processor 303 receives data required by the portable device 100 for reproducing contents that are being reproduced by the electronic device 120 from the electronic device 120 via the wireless communication device 302.

Figure 18:
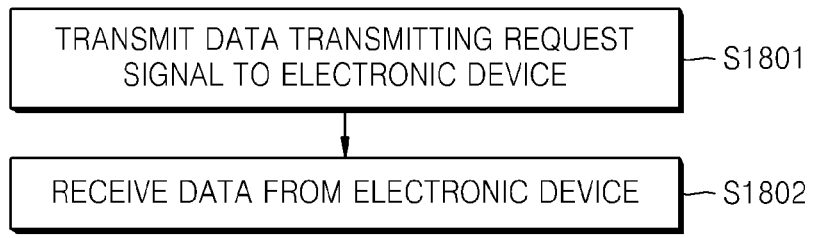
FIG. 18 is a detailed flowchart which illustrates an operation for receiving data from the electronic device referred to in FIG. 17, according to an exemplary embodiment.

The receiving of the contents from the electronic device 120 may be performed in accordance with operations which are illustrated in FIG. 18. FIG. 18 is a detailed flowchart which illustrates an operation for receiving data from the electronic device 120, according to an exemplary embodiment.

Referring to FIG. 18, when the processor 303 detects the occurrence of the short distance communication between the portable device 100 and the remote control 110 via the short distance communication device 111, in operation S1801, the processor 303 transmits a data transmitting request signal to the electronic device 120 via the wireless communication unit 302. Thus, in operation S1802, the processor 303 receives data from the electronic device 120 via the wireless communication unit 302. The received data may include a response signal with respect to the data transmitting request signal.

Referring to FIG. 17, the processor 303 receives data required for reproducing contents from the electronic device 120 via the wireless communication unit 302, and then, in operation S1703, the processor 303 transmits the received data to the portable device 100 via the short distance communication unit 111.

Figure 19:
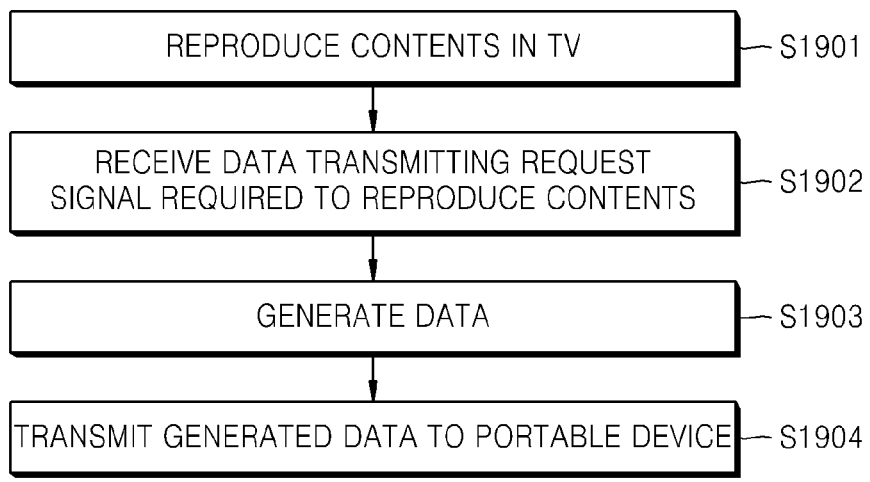
FIG. 19 is a flowchart which illustrates an operation of the electronic device, according to another exemplary embodiment.

FIG. 19 is a flowchart which illustrates an operation of the electronic device 120, according to another exemplary embodiment. The method illustrated in FIG. 19 may be performed by the processor 405.

In operation S1901, the electronic device 120 reproduces contents. Then, in operation S1902, the processor 405 receives a data transmitting request signal which is required by the portable device 100 in order to perform, in the portable device 100, a seamless playback of contents that are being reproduced by the electronic device 120. The data transmitting request signal is received from at least one of the remote control 110, via the wireless communication device 401, and the portable device 100, via the communication unit 402. Thus, in operation S1903, the processor 405 generates data required for reproducing contents.

In operation S1904, the processor 405 transmits the generated data to the remote control 110 via the wireless communication unit 401, or transmits the generated data directly to the portable device 100 via the communication device 402.

Figure 20:
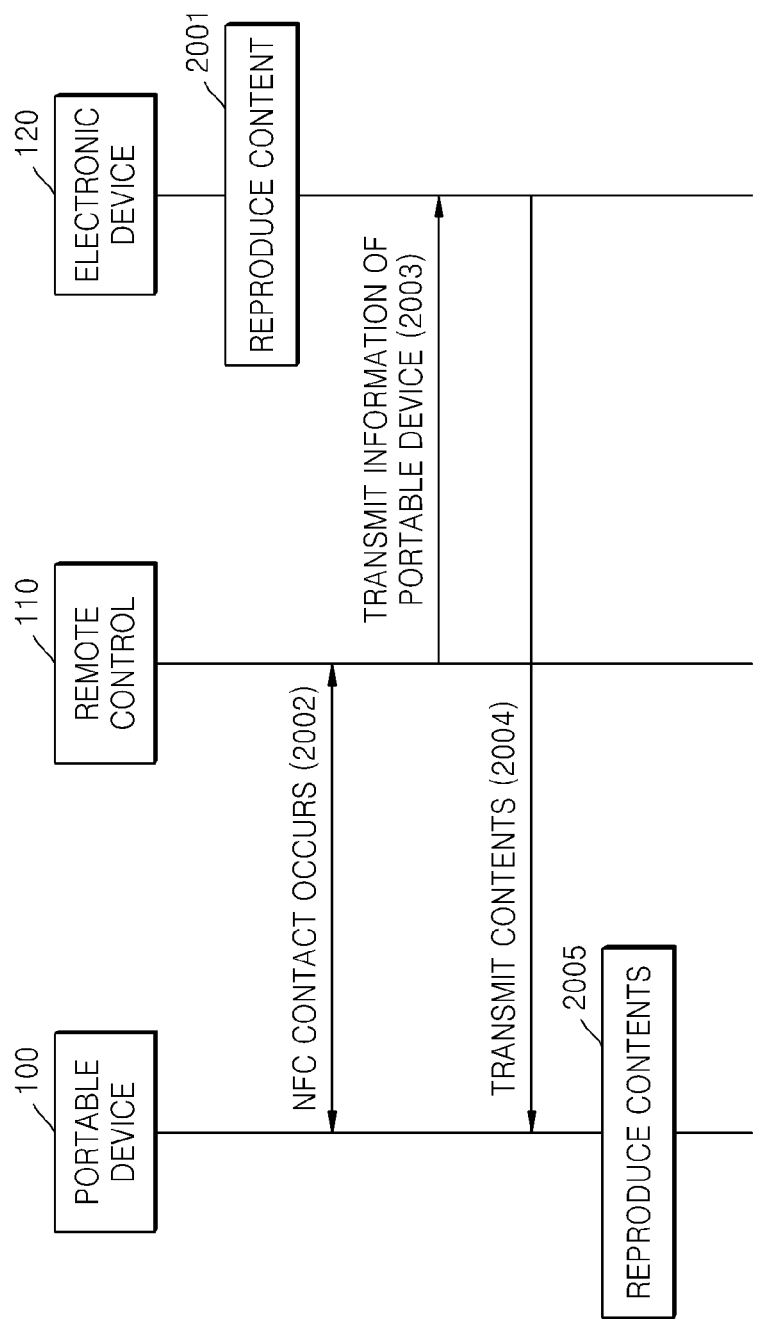
FIG. 20 is a flowchart which illustrates operations between the portable device, the remote control, and the electronic device in a contents reproducing method, according to an exemplary embodiment.

FIG. 20 is a flowchart which illustrates operations between the portable device 100, the remote control 110, and the electronic device 120 in a contents reproducing method according to an exemplary embodiment. In detail, FIG. 20 shows a case in which the remote control 110 provides a request for data to the electronic device 120 when the portable device 100 performs a seamless playback of contents that are being reproduced by the electronic device 120 based on an occurrence of an NFC contact between the portable device 100 and the remote control 110. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Referring to FIG. 20, when the electronic device 120 reproduces contents in operation 2001, and when an occurrence of an NFC contact between the portable device 100 and the remote control 110 is detected in operation 2002, the remote control 110 transmits information relating to the portable device 100 to the electronic device 120 in operation 2003. The information relating to the portable device 100, which is transmitted to the electronic device 120, includes information that is transmitted from the portable device 100 to the remote control 110 based on the occurrence of the NFC contact. The information relating to the portable device 100 includes information required by the electronic device 120 for transmitting information to the portable device 100, and may include, for example, identification information relating to communicating with the portable device 100. The information that is transmitted from the electronic device 120 to the portable device 100 includes information required for performing a seamless playback of contents.

In operation 2004, the electronic device 120 transmits contents that are being reproduced by using the received information relating to the portable device 100 to the portable device 100. Thus, in operation 2005, the portable device 100 performs a seamless playback of the contents.

Figure 21:
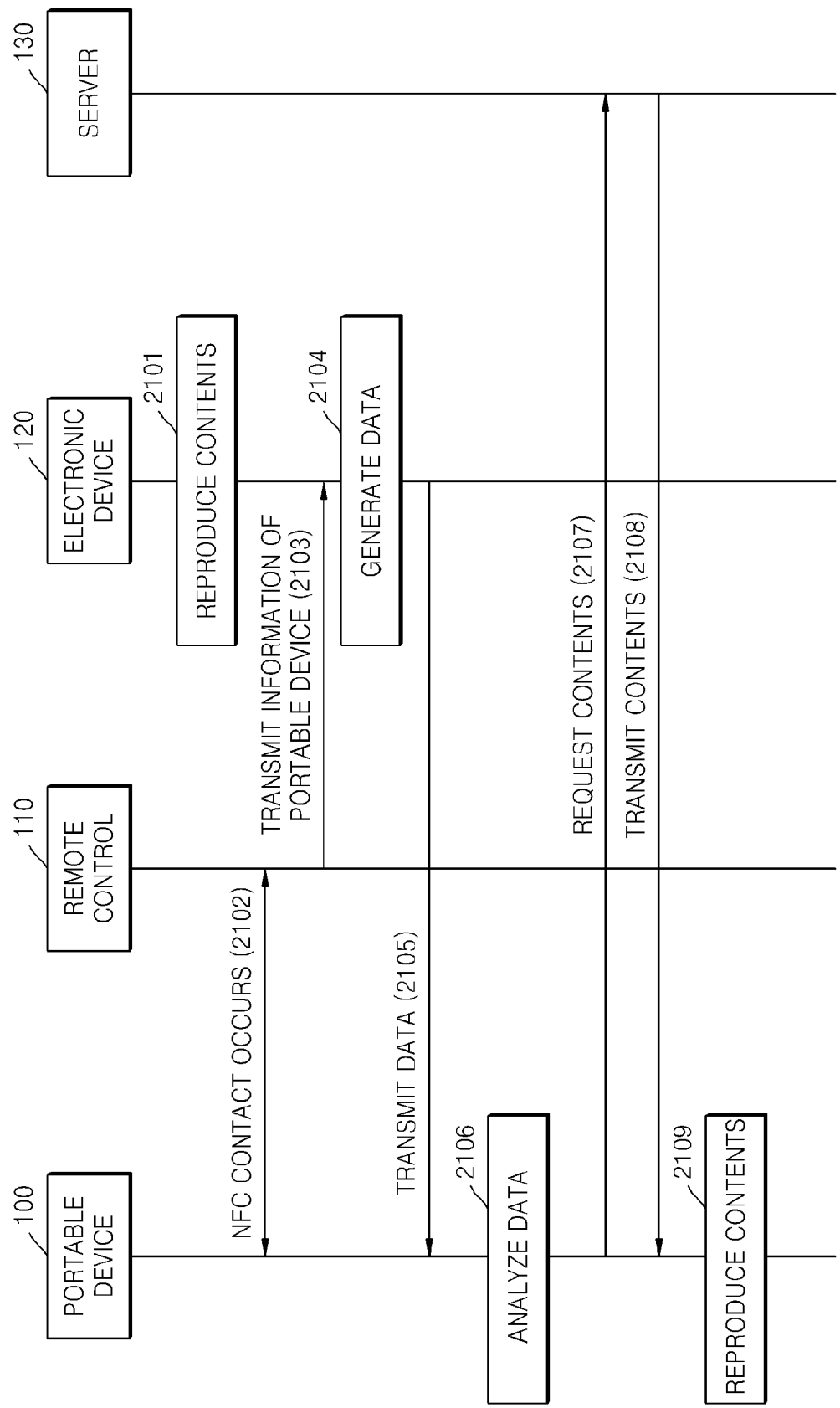
FIG. 21 is a flowchart which illustrates operations between the portable device, the remote control, the electronic device, and the server in a contents reproducing method, according to another exemplary embodiment.

FIG. 21 is a flowchart which illustrates operations between the portable device 100, the remote control 110, the electronic device 120, and the server 130 in a contents reproducing method according to another exemplary embodiment. In detail, FIG. 21 shows a case in which data required by the portable device 100 for performing a seamless playback of contents that are being reproduced by the electronic device 120 is transmitted from the electronic device 120 to the portable device 100. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Respective operations 2101, 2102, and 2103 of FIG. 21 are the same as corresponding operations 2001, 2002, and 2003 of FIG. 20, respectively, and thus their detailed description will be omitted.

In operation 2104, the electronic device 120 generates data required by the portable device 100 for performing a seamless playback of contents that are being reproduced. Then, in operation 2105, the electronic device 120 transmits the generated data to the portable device 100, based on information relating to the portable device 100, which is received in operation 2103.

When the portable device 100 analyzes the received data in operation 2106 and determines to receive contents from the server 130, the portable device 100 provides a request for contents to the server 130 in operation 2107. Thus, when the portable device 100 receives contents from the server 130 in operation 2108, the portable device 100 generates the received contents in operation 2109.

FIG. 22 is a flowchart which illustrates operations between the portable device 100, the remote control 110, and the electronic device 120 in a contents reproducing method according to another exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Referring to FIG. 22, when the electronic device 120 reproduces contents in operation 2201, and when an NFC contact between the portable device 100 and the remote control device 110 occurs in operation 2202, the remote control 110 transmits information relating to the electronic device 120 to the portable device 100 in operation 2203. Then, when the portable device 100 provides a request for contents to the electronic device 120 in operation 2204, the portable device 100 receives contents from the electronic device 120 in operation 2205, and reproduces the received contents in operation 2206.

One or more programs, each of which includes commands for executing a method for reproducing contents, according to the one or more exemplary embodiments described above, can also be embodied as computer-readable codes on a transitory or non-transitory computer-readable recording medium. The computer-readable recording medium may include any data storage device that can store data which can be thereafter read by a computer system. Examples of the computer-readable recording medium include read-only memory (ROM), random-access memory (RAM), CD-ROMs, magnetic tapes, floppy disks, optical data storage devices, and/or any other suitable medium. The computer-readable recording medium can also be distributed over network-coupled computer systems so that the computer-readable code is stored and executed in a distributed fashion.

While the present inventive concept has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A content reproducing method which is executable by using a portable device, the portable device comprising a first communication unit which is configured to establish a short distance connection with an external remote and a second communication unit which is configured to establish a connection with an external display device, the external remote being configured to control the external display device, and the content reproducing method comprising:
reproducing content;
providing, by using the first communication unit, address information of the portable device to the external remote;
after the address information of the portable device is provided to the external remote, receiving a content request including address information of the external display device directly from the external display device via the second communication unit; and
providing the content to the external display device via the second communication unit using the received address information of the external display device.

2. The content reproducing method of claim 1, wherein the short distance connection is based on at least one near field communication standard.

3. The content reproducing method of claim 1, wherein the first communication unit is configured to establish the short distance connection by transmitting a message having a short distance communication data exchange format to the external remote.

4. The content reproducing method of claim 3, wherein the message comprises at least one of information relating to a content provider, device information relating to the portable device, user information relating to the portable device, meta data relating to the content, and information relating to a time when the content is reproduced.

5. The content reproducing method of claim 1, further comprising:
receiving a reproduction completion guidance message from the external display device; and
displaying the received reproduction completion guidance message on the portable device.

6. A non-transitory computer-readable recording medium having recorded thereon at least one program which includes commands for executing the content reproducing method of claim 1.

7. A portable device comprising:
a first communication unit configured to establish a short distance connection with an external remote which is configured to control an external display device;
a second communication unit configured to establish a connection with the external display device,
a touch display configured to display content and to receive touch input; and
a processor configured to:
provide address information of the portable device to the external remote via the first communication unit,
after the address information of the portable device is provided to the external remote, receive a content request including address information of the external display device directly from the external display device via the second communication unit, and
provide the content to the external display device via the second communication unit using the received address information of the external display device.

8. The portable device of claim 7, wherein the processor is further configured to provide data via the first distance communication unit to the external remote,
wherein the data comprises at least one of information relating to a content provider, device information relating to the portable device, user information relating to the portable device, and meta data relating to the content.

9. The portable device of claim 7, wherein the content comprises an image relating to the content.

10. The portable device of claim 7, wherein the short distance connection is based on at least one near field communication standard.

11. The portable device of claim 10, wherein the first communication unit is further configured to convert the data into a message having a short distance communication data exchange format and transmits the message to the external remote.

12. The portable device of claim 11, wherein the processor is further configured to receive a reproduction completion guidance message directly from the external display device via the second communication unit, and to display the received reproduction completion guidance message on the touch display.

13. The portable device of claim 7, wherein the first communication unit is configured to establish the short distance connection by a message having a short distance communication data exchange format to the external remote.

14. The portable device of claim 13, wherein the message comprises at least one of information relating to a content provider, device information relating to the portable device, user information relating to the portable device, meta data relating to the content, and information relating to a time when the content is reproduced.

15. The portable device of claim 7, wherein the processor is further configured to provide a user interface based on the touch display, and control a reproduction of the content.

16. The portable device of claim 7, wherein the first communication unit is configured to establish the short distance connection by transmitting, to the external remote, a message which includes at least one of information relating to a content provider, device information relating to the portable device, user information relating to the portable device, meta data relating to the content, and information relating to a time when the content is displayed, which corresponds to a time when the short distance connection is established.

17. The portable device of claim 16, wherein the processor is further configured to control the first communication unit to transmit the message to the external remote.

18. The portable device of claim 17, wherein the message has a short distance communication data exchange format.

* * * * *